US012397325B2

(12) United States Patent
Cullen

(10) Patent No.: US 12,397,325 B2
(45) Date of Patent: Aug. 26, 2025

(54) MOBILE ENCLOSED WASH SYSTEM

(71) Applicant: G.C. MOBILE INNOVATION INC., Smithers (CA)

(72) Inventor: Glen Cullen, Smithers (CA)

(73) Assignee: G.C. MOBILE INNOVATION INC., Smithers (CA)

( * ) Notice: Subject to any disclaimer, the term of this patent is extended or adjusted under 35 U.S.C. 154(b) by 0 days.

(21) Appl. No.: 18/513,920

(22) Filed: Nov. 20, 2023

(65) Prior Publication Data

US 2024/0082883 A1 Mar. 14, 2024

Related U.S. Application Data

(63) Continuation-in-part of application No. 18/082,443, filed on Dec. 15, 2022.

(30) Foreign Application Priority Data

Dec. 15, 2021 (CA) .................................... 3,117,192

(51) Int. Cl.
*B08B 3/02* (2006.01)
*B08B 13/00* (2006.01)

(52) U.S. Cl.
CPC ................ *B08B 3/02* (2013.01); *B08B 13/00* (2013.01); *B08B 2203/0247* (2013.01); *B08B 2203/027* (2013.01)

(58) Field of Classification Search
CPC ..... B08B 13/00; B08B 3/02; B08B 2203/027; B08B 2203/0247
See application file for complete search history.

(56) References Cited

U.S. PATENT DOCUMENTS 2,751,882 A * 6/1956 Coyner ...................... B60P 3/04 62/304
5,140,719 A * 8/1992 Cowan ...................... B60S 1/56 15/313

(Continued)

OTHER PUBLICATIONS

Afex Fire Suppression Systems, Liquid Chemical Systems, available at least as early as Sep. 18, 2021, retrieved Oct. 30, 2023, 9 pages.

(Continued)

*Primary Examiner* — Benjamin L Osterhout
(74) *Attorney, Agent, or Firm* — Robert A. Nissen

(57) ABSTRACT

This system was designed after many years of trying to resolve dirt and dust accumulation in confined areas on mobile and stationary equipment, and other types of plant equipment, including equipment of offshore oil and gas platforms, maritime vessels, and others, and more generally any kind of motorized or mechanical equipment with internal areas that accumulate dust and dirt. The areas where dust and dirt accumulation occur would normally only be accessible by removing major components. The initial installation of the wash system may be time consuming, however, may eliminate future risk exposure and manning. The system may be designed to utilize existing pressure washers and air systems. The supply manifold may be constructed from steel, hydraulic lines, pressure wash nozzles and angled fittings. The installer may assess areas of accumulation, directing the nozzles at the general area. Once the system has been installed, mechanical operators may easily attach the device to a pressure source. Quick connect fittings would be installed outside the machine, connecting pressurized water or air to the supply manifold.

26 Claims, 12 Drawing Sheets

(56) References Cited

U.S. PATENT DOCUMENTS

| | | | | | |
|---|---|---|---|---|---|
| 5,924,478 | A * | 7/1999 | Crocker | F28G 9/00 165/95 |
| 2004/0110548 | A1* | 6/2004 | Pope | B08B 5/02 460/115 |
| 2007/0169796 | A1* | 7/2007 | Johnson | B08B 3/026 134/123 |
| 2014/0034092 | A1* | 2/2014 | Dorshimer | F01D 25/002 134/171 |
| 2014/0144151 | A1* | 5/2014 | Bifulco | F04D 29/705 29/888.011 |
| 2019/0031155 | A1* | 1/2019 | Mizuno | B08B 3/08 |
| 2019/0202412 | A1* | 7/2019 | Jacobson | A61L 2/22 |
| 2020/0386146 | A1* | 12/2020 | Andrios | F01P 1/02 |

OTHER PUBLICATIONS

ESD Waste2water, Inc., Powerful Water Cannons, available at least as early as Jan. 27, 2021, retrieved Oct. 30, 2023 from https://web.archive.org/web/20210127014208/https://www.waste2water.com/wp-content/uploads/2020/05/Water-Cannon-Cut-Sheet.pdf, 2 pages.

ESD Waste2water Inc., Solids Management System (SMS), available Feb. 10, 2016, retrieved from https://www.youtube.com/watch?v =_aZbQSEpdxk&t=1s, 2 pages.

* cited by examiner

MOBILE ENCLOSED WASH SYSTEM

TECHNICAL FIELD

This document discusses systems designed to obviate and reduce sawdust, dirt and other accumulations in enclosed areas on mobile equipment. This disclosure relates to a system designed to reduce contaminant accumulation on mobile equipment, specifically in enclosed areas, such as under the cab of the equipment, in enclosed panel areas, or other areas of the equipment, which might be hard to access without removing guarding.

BACKGROUND

The following paragraphs are not an admission that anything discussed in them is prior art or part of the knowledge of persons skilled in the art. Currently, with mobile equipment, easy-to-access areas may be relatively easily monitored and maintained. Unfortunately, it is difficult to maintain and clean enclosed areas on mobile equipment. Dust and other organic materials can accumulate, posing a fire hazard. The time it takes to remove and inspect these enclosed areas is not feasible for some operations.

SUMMARY

The mobile wash systems disclosed herein would remediate the above concerns. The systems here may be used on mobile and stationary equipment, and other types of plant equipment, including equipment of offshore oil and gas platforms, maritime vessels, and others, and more generally any kind of motorized or mechanical equipment with internal areas that accumulate dust and dirt.

A wash system designed for areas on mobile equipment is disclosed. The system may reduce dust/dirt and other accumulation around enclosed areas. The system when installed, may target areas that would only be accessible by removing panels, seats or other major components.

A washing manifold, stainless steel or black pipe, may be installed on enclosed/confine spaces on mobile/heavy duty equipment, to eliminate dirt, dust and another contaminant buildup. Pressure washer nozzles may be installed on the manifold, for example running parallel or in series. The system may be supplied water or air, depending on the consumer's preference.

Nozzle size may vary, pending on pressure washer being used. Nozzle size may be matched with pump rate, for example gallons per minute (GPM), to achieve desired pressure.

The system may be used in conjunction with a pressure washer and/or air supply. The system may be used with pressure washers and/or air, and may be adaptable for winter and summer conditions. The system is designed to reduce fire risk, while reducing maintenance costs.

An apparatus is disclosed comprising: mobile equipment that defines an area in which one more of dirt, dust, and contaminants accumulate during use; a manifold mounted in the area; a plurality of pressure washer nozzles that are connected to the manifold and each directed to spray washer fluid to dislodge dirt, dust, and contaminants that has accumulated in the enclosed area during use; and a high-pressure washer fluid supply line connected to the manifold.

A method is disclosed comprising supplying high-pressure washer fluid to a high-pressure washer fluid supply line mounted to mobile equipment, in which the high-pressure supply line is connected to a manifold, which mounts a plurality of pressure washer nozzles located within an area of the mobile equipment, such that the high-pressure washer fluid is ejected from the plurality of pressure washer nozzles to dislodge dirt, dust, and contaminants that have accumulated in the area during use.

A wash system for mobile equipment is disclosed comprising: a manifold; a plurality of pressure washer nozzles; a high-pressure washer fluid supply line; and a quick-connect fitting on the high-pressure supply line for connection to an external washer fluid supply; in which the manifold and plurality of pressure washer nozzles comprise area mounting parts and are structured to mount within an area of the mobile equipment where dirt, dust, and contaminants accumulate during use of the mobile equipment.

An enclosed mobile wash system may comprise multiple washing manifolds, for example comprising metal such as stainless steel, grade 304, 316SS, 40SS, 326, SCH40 40S, and black pipe grade A or grade 8, and for example comprising metal nozzles such as stainless-steel washing nozzles (which may vary in size to match pump GPM). The nozzles may be matched based on required outlet pressure, for example varying from number 2-6 nozzle size, 4 wire high pressure supply lines and a high pressure quick connect. The manifolds, nozzles and high-pressure lines may vary in size and length. This may allow the system to be installed on a variety of equipment, fabricated to meet the requested requirements.

Enclosed panels may be removed on mobile units, providing a user with access for installation. During installation, the manifold may be mounted and secured in a suitable fashion such as with one or more of tube clamps, bolts or welding, into place. High-pressure nozzles may be directed at areas of dirt, dust and other material accumulation. The orientation of each nozzle may be adjustable to target certain areas as desired. The supply line may be routed, mounted and secured with tube clamps or other suitable mechanisms.

The initial operation may comprise the following stages. An operator may install a supply line to a quick connect fitting. Once installed and the pressure washer/air system is actuated, pressurized water or air enters the system. A selector valve (if present) may be actuated to direct the fluids into the desired manifold or set of manifolds. All fluid may pass through a high-pressure filter. The water/air may then be directed through the manifold, exiting the high-pressure nozzles. Water/air targets and sprays the areas of accumulation, removing accumulation.

The disclosed systems were designed after many years of trying to resolve dirt and dust accumulation in confined areas on loaders and forklifts. Various areas where dust and dirt accumulation occur within mobile equipment are normally only accessible by removing major components. Initial installation may be time consuming, however, once completed may eliminate future risk exposure and manning. The system was designed to utilize existing pressure washers and air systems. The supply manifold may be constructed from metal (such as steel), hydraulic lines, pressure wash nozzles and angled fittings. The installer may assess areas of accumulation, installing the system and directing the nozzles at the general areas that accumulate dirt, debris, and contaminants. Once the system has been installed, an operator of mechanics may easily attach the device to an external washer fluid supply. Quick connect fittings may be installed outside the machine, connecting pressurized water or air to the supply manifold(s).

An apparatus is also disclosed comprising: equipment that defines an enclosed area in which one more of dirt, dust, and contaminants accumulate during use; a manifold mounted in the enclosed area; a plurality of pressure washer nozzles that are connected to the manifold and each directed to spray washer fluid to dislodge dirt, dust, and contaminants that has accumulated in the enclosed area during use; and a high-pressure washer fluid supply connector. The connector may be on a high-pressure washer fluid supply line connected to the manifold.

A wash system for equipment is disclosed comprising: a manifold; a plurality of pressure washer nozzles; and a quick-connect fitting for connection to an external washer fluid supply; in which the manifold and plurality of pressure washer nozzles comprise enclosed area mounting parts and are structured to mount within an enclosed area of the equipment where dirt, dust, and contaminants accumulate during use of the equipment. The connector may be on a high-pressure washer fluid supply line connected to the manifold.

The systems here may be used on mobile and stationary equipment, and other types of plant or facility equipment, including equipment of offshore oil and gas platforms, maritime vessels, wood-processing facilities and saw mills, industrial, commercial, and residential facilities, and others, including computer systems, and more generally any kind of motorized or mechanical equipment with internal areas that accumulate dust and dirt. The connector may be on a high-pressure washer fluid supply line connected to the manifold.

The present disclosure pertains to a novel wash manifold system that may use stainless steel pipes and high-pressure rated plastic pipes for efficient and targeted cleaning applications. The wash manifold system may incorporate a series of pipes, strategically designed and arranged to deliver pressurized cleaning fluids to specific areas. The selection of the appropriate pipe materials may be crucial to ensure optimal performance, durability, and resistance to high pressure.

For stainless steel pipes, the wash manifold system may include various sizes up to 3 inches, adhering to industry-standard sizing based on nominal pipe size (NPS) and pipe schedule. The available stainless steel pipe sizes, up to 3 inches, that can be utilized in the wash manifold system include ⅛ inch (NPS 0.125), ¼ inch (NPS 0.25), ⅜ inch (NPS 0.375), ½ inch (NPS 0.5), ¾ inch (NPS 0.75), 1 inch (NPS 1), 1¼ inch (NPS 1.25), 1½ inch (NPS 1.5), 2 inches (NPS 2), 2½ inches (NPS 2.5), and 3 inches (NPS 3). The stainless-steel pipes utilized in the system are available in various grades, including 304 stainless steel known for its excellent corrosion resistance, 316 stainless steel offering enhanced resistance to corrosive agents and higher temperatures, and 40SS stainless steel providing increased strength and durability for high-pressure applications. Other sizes larger or smaller than as stated may be used, as well as other materials.

In addition to stainless steel pipes, the wash manifold system may incorporate high-pressure rated plastic pipes for specific applications. These plastic pipes may be designed to withstand elevated pressure levels and offer advantages such as corrosion resistance and lightweight construction. The high-pressure rated plastic pipes utilized in the wash manifold system include PVC (Polyvinyl Chloride), CPVC (Chlorinated Polyvinyl Chloride), and PE (Polyethylene). PVC is known for its durability and resistance to chemical corrosion, CPVC offers enhanced temperature resistance, and PE provides excellent chemical resistance, durability, and flexibility.

By incorporating stainless steel pipes of various grades, including 304 stainless steel, 316 stainless steel, and 40SS stainless steel, along with high-pressure rated plastic pipes such as PVC, CPVC, and PE, the wash manifold system may ensure optimal performance, durability, and resistance to high-pressure cleaning operations. The unique combination of these pipe materials in the present disclosure provides a versatile and reliable solution for targeted cleaning applications in various industrial settings.

In various embodiments, there may be included any one or more of the following features: A pump connected to supply washer fluid to the high-pressure washer fluid supply line. A washer fluid supply connected to the high-pressure washer fluid supply line. The washer fluid supply is external to the mobile equipment. The washer fluid supply comprises water or air. The high-pressure supply line has a washer fluid supply connector. The washer fluid supply connector comprises a quick-connect fitting. The washer fluid supply connector is mounted to the mobile equipment external to the mobile equipment. The supply of fluid passes through a filter, such as a high-pressure filter, before entering the manifold. The nozzles may be rotary or rotating nozzles. The manifold is connected to the area using magnets. The high-pressure washer fluid supply line comprises a fluid filter. The manifold is connected to supply washer fluid to the plurality of pressure washer nozzles in parallel or in series. A plurality of manifolds, each having a plurality of pressure washer nozzles, and each connected to the high-pressure supply line. The mobile equipment defines a plurality of enclosed or exposed areas; and each of the plurality of enclosed or exposed areas contains one or more of the plurality of manifolds and respective plurality of pressure washer nozzles. The enclosed area is accessible by one or more of guarding, panels, or seats. The mobile equipment comprises a loader or lifter. The mobile equipment comprises a loader, a lifter, a grain combine, a tractor, a plow, a harvester, a telehandler, a seed drill, a rake, a harrow, a hay baler, a grader, a mining truck, a mining shovel, a bulldozer, an excavator, a drill rig, a drag line, a crane, a boat, a forest machine, a skidder, a winch assist, a train car, a train engine, a rail. The manifold is connected to the area using one or more of magnets, fasteners, welding, and adhesive. the area comprises a windshield or window. The plurality of pressure washer nozzles are adjustable about a range of angular positions to aim in predetermined directions. The plurality of pressure washer nozzles are adjustable about a range of spray pattern between 0 and 80 degrees, for example equal to or about 65 degrees. The plurality of pressure washer nozzles are oriented between 20 and 32 inches the area. The plurality of pressure washer nozzles are oriented to overlap, with adjacent of the plurality of pressure washer nozzles, in spray pattern. The high-pressure washer fluid supply line is connected to provide washer fluid at 500 psi or greater. A kit comprising the manifold and plurality of pressure washer nozzles. The high pressure washer fluid supply line comprises one or more of a selector valve, and a fitting, having plural outlets that comprise a first outlet connected to the first manifold and a second outlet connected to the second manifold. The manifold comprises a plurality of manifolds, each mounted in different areas of the mobile equipment in which one more of dirt, dust, and contaminants accumulate during use. The manifold is connected to supply washer fluid to the plurality of manifolds in parallel or in series. The area comprises an enclosed area of the mobile equipment. One or more of the manifolds, the plurality of pressure washer nozzles, and the high-pressure supply line comprise metal. The manifold is connected to the area using tube clamps. Prior to supplying the high-pressure washer fluid, connecting the high-pressure supply line to a washer fluid supply that is external to the mobile equipment. After supplying the high-pressure washer fluid, disconnecting the high-pressure supply line from the washer fluid supply. Prior to supplying the high-pressure washer fluid, installing the manifold and plurality of pressure washer nozzles within the enclosed area. Allowing the mobile equipment to cool down over a predetermined period of time prior to providing high-pressure washer fluid to the manifold. The manifold comprises a plurality of manifolds, each mounted in different areas of the mobile equipment in which one more of dirt, dust, and contaminants accumulate during use. Using one or more of a selector valve or branched fitting to provide high-pressure washer fluid to the plurality of manifolds.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the FIGURES, in which like reference characters denote like elements, by way of example, and in which.

DETAILED DESCRIPTION

Figure 1:
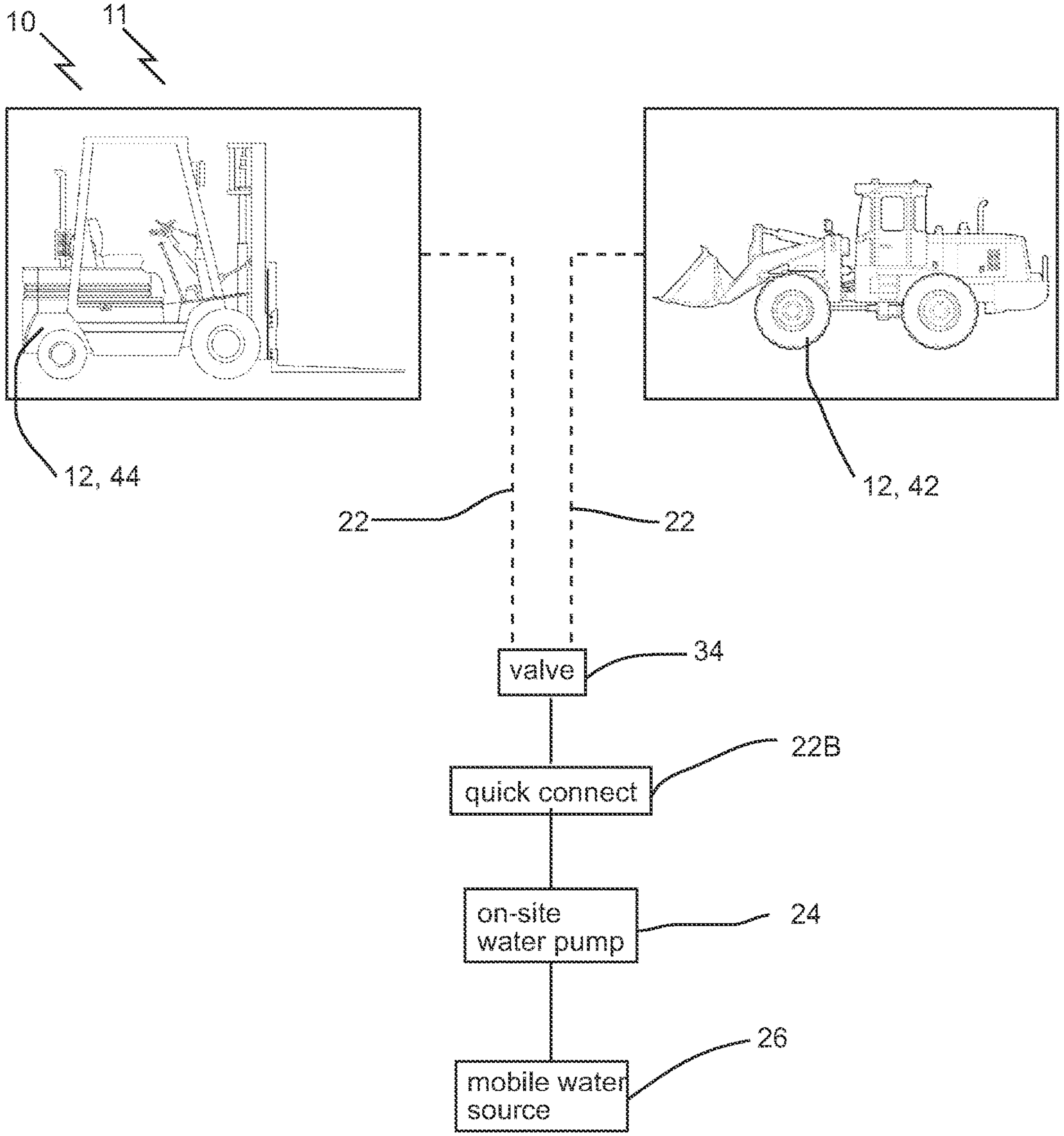
FIG. 1 is a schematic representation of an enclosed mobile wash system.
Figure 2:
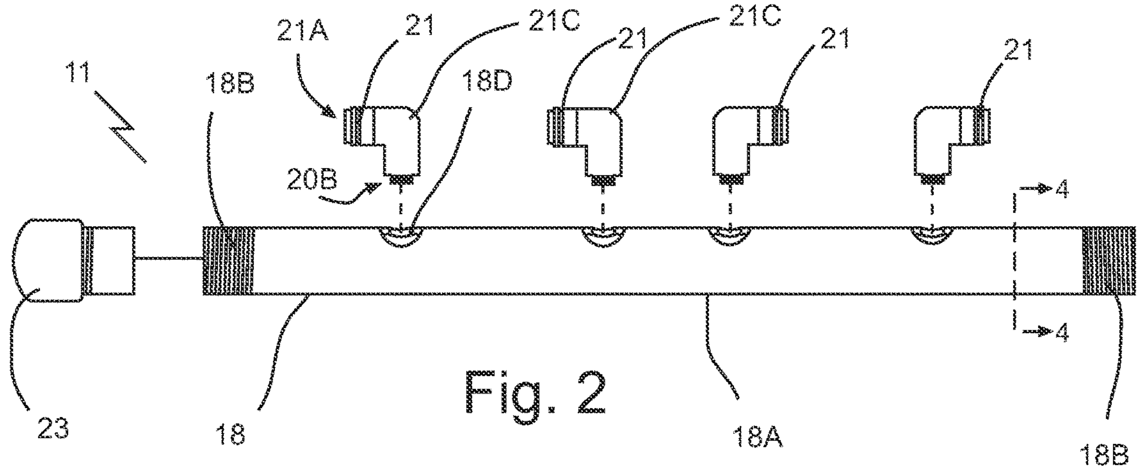
FIG. 2 is an exploded view of an enclosed mobile wash system, made of a manifold, nozzles, and fittings.
Figure 3:
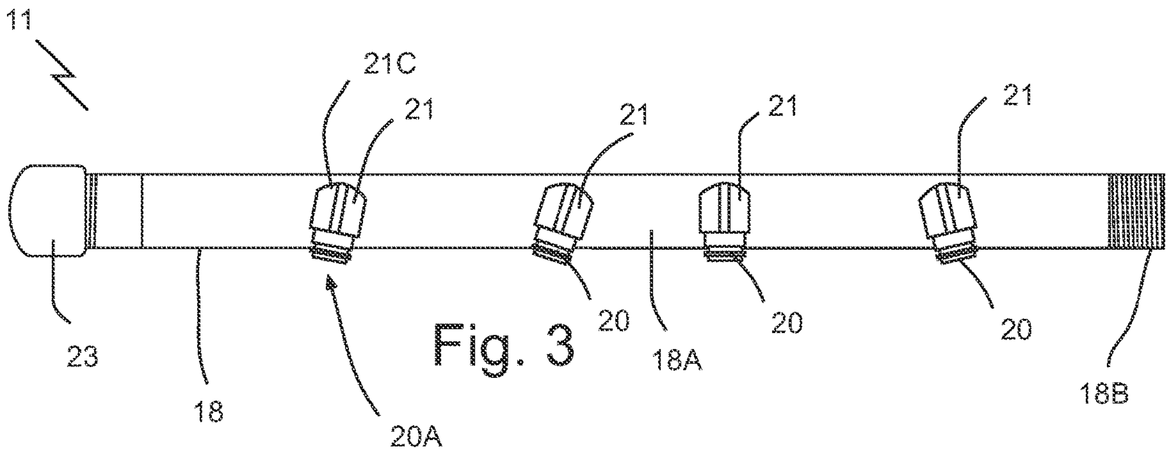
FIG. 3 is a side elevation view of the manifold of FIG. 2 after assembly.
Figure 4:
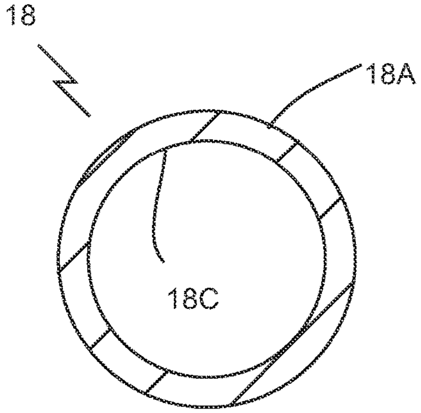
FIG. 4 is a cross sectional view taken along the 4-4 lines of FIG. 2.
Figure 5:
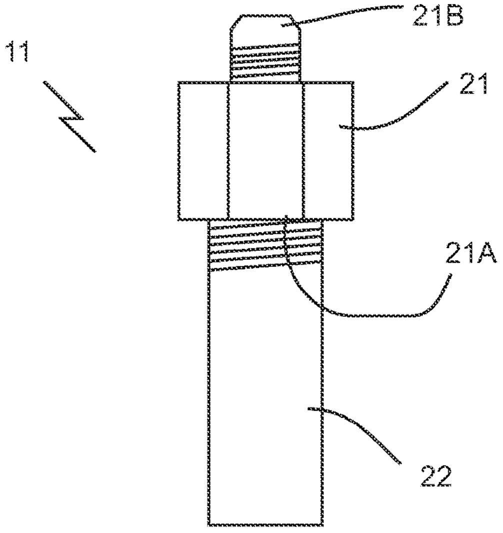
FIG. 5 is a side elevation view of a fitting for an end of the manifold of FIG. 2.
Figure 6:
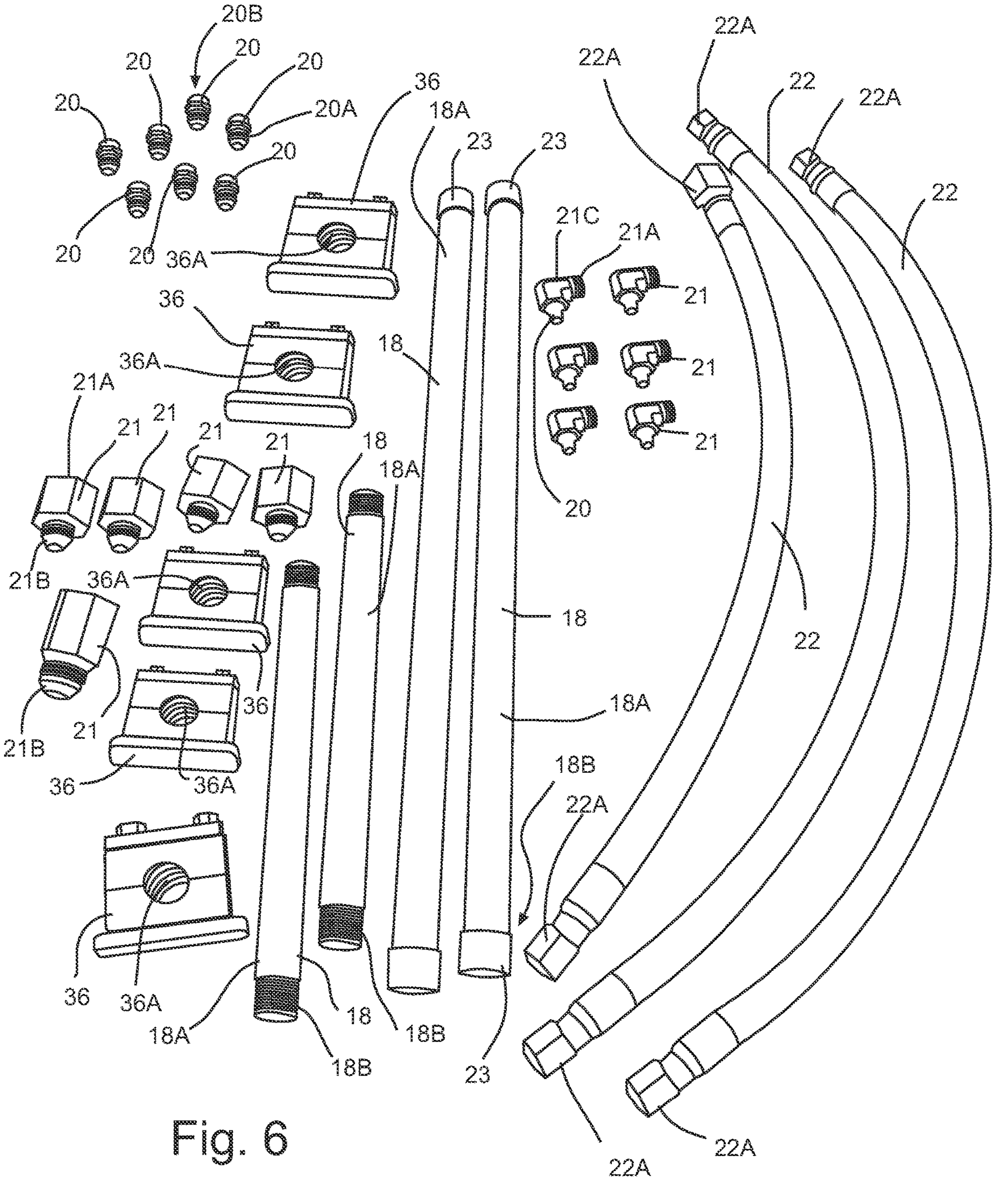
FIG. 6 is a perspective view of a kit of components for a mobile wash system.

Immaterial modifications may be made to the embodiments described here without departing from what is covered by the claims.

Mobile equipment includes machinery that is capable of moving on its own, whether by wheels, tracks, or rails. One of the most common types of mobile equipment is heavy duty machinery. Heavy duty machinery typically contains enclosed areas, which may house diesel engines, hydraulic lines, and other components essential for operation. Since mobile equipment and heavy-duty machinery are often operating in undeveloped areas, such as construction sites and oilfield leases, they are prone to becoming quite dirty, whether by accumulation of mud, soot, dust, grasses, sawdust, or other contaminants. Keeping the enclosed areas of heavy-duty equipment clean may be difficult, but may be essential to prolong the lifespan of the equipment and reduce the risks of fires.

Referring to FIGS. 1-15, a wash system 10 for mobile equipment 12 is disclosed. The wash system 10 may have a manifold 18, a plurality of pressure washer nozzles 20, and a high-pressure washer fluid supply line 22. The system 10 may form part of an apparatus 11 comprising mobile equipment 12 which may define an area, such as an enclosed area 14. The manifold 18 may be mounted in the enclosed area 14 of the mobile equipment. The plurality of pressure washer nozzles 20 may be connected to the manifold 18 and each may be directed to spray washer fluid 32. The high-pressure supply line 22 may be connected to supply the manifold 18. The high-pressure supply line 22 may comprise a washer fluid supply connector 22B, such as a quick-connect fitting for connection to an external washer fluid supply 26 (a supply 26 that is not mounted to the mobile equipment and is external to the mobile equipment). The mobile equipment 12 may be motorized and able to move independently, for example, the mobile equipment 12 may comprise a loader or lifter. The mobile equipment may comprise a loader, a lifter, a grain combine, a tractor, a plow, a harvester, a telehandler, a seed drill, a rake, a harrow, a hay baler, a grader, a mining truck, a mining shovel, a bulldozer, an excavator, a drill rig, a drag line, a crane, a boat, a forest machine, a skidder, a winch assist, a train car, a train engine, a rail. The mobile equipment may comprise equipment that is used in one or more of mining, agricultural, construction, power generation, oil and gas, railway, forestry, and marine transport industries. The area that is targeted for assembly of the system 10 may be one where one more of dirt, dust, and contaminants 16 may accumulate in during use of the mobile equipment 12. The area 14 may be an enclosed area or an exposed area, with the former being contained within the interior of the mobile equipment, and the latter being accessible from the exterior of the mobile equipment. High-pressure washer fluid may be supplied to the high-pressure supply line 22, which may be mounted to mobile equipment 12. The high-pressure supply line or lines 22 may comprise suitable materials, for example referring to FIG. 11, the hose used in the example is a 6000-psi rated 12.7 mm diameter GH493-8 from Eaton™ serial number EN856 R12/100R12. Referring to FIGS. 1-13, the high-pressure supply line or lines 22 may be connected to the manifold or manifolds 18, such that high-pressure washer fluid is ejected from each set of plurality of pressure washer nozzles 20 to dislodge dirt, dust, and contaminants 16 that have accumulated in the enclosed area 14 during use of the mobile equipment 12. One or more of the manifolds 18, plurality of pressure washer nozzles 20, and high-pressure supply line 22 may comprise or be formed of metal. The enclosed area 14 may be accessible through removing one or more of guarding 28, panels 30, or seats (not shown). The enclosed areas selected for assembly may ones whose manual cleaning without use of system 10 may be otherwise time consuming, costly and inefficient.

Referring to FIGS. 2-6 and 11, the manifold 18 may comprise suitable structure and parts. The manifold 18 may comprise a tube body 18A, which may define threaded ends 18B, an internal bore 18C and nozzle mounting apertures 18D. The threaded ends 18B of the manifold 18 may connect to a high-pressure supply line 22 or a pipe cap 23. The high-pressure supply line 22 may supply washer fluid to the internal bore 18C of the manifold 18. The threaded end 20B of plurality of pressure washer nozzles 20 may connect to the nozzle mounting apertures 18D of the manifold 18. Apertures 18D may be drilled out of a metal tube to form the manifold 18. The nozzle mounting apertures 18D of the manifold 18 may be a suitable size, for example 7/32 inches. The threaded ends 18B and 20B of the manifold 18 and the pressure washer nozzles 20, respectively, may comprise Teflon or other sealing tape or adhesive on the threaded connections. The washer fluid may move through the internal bore 18C of the manifold to the nozzle mounting apertures 18D, allowing the washer fluid to be spray out of a spray end 20A of the plurality of pressure washer nozzles 20 toward targeted areas within the enclosed areas 14. The pressure washer nozzles 20 may be connected to or form part of an angled fitting 21C, which may allow the washer fluid to be directed out of the spray end 20A towards a selected portion of the enclosed area 14. Other fittings 21 may be used to connect various lines 22, nozzles 21, and manifolds 18 together, in any configuration, for example in parallel or series or both orientations. The pressure washer nozzles 20 may comprise suitable dimensions and orientations, such as 1/4" male to female pipe sections angled at 0, 45, or 90 degrees. The nozzles may be suitable nozzles, including fixed and moving nozzles. Rotating nozzles/rotary nozzles are an example of a moving nozzle that uses centrifugal force to produce a strong impact and a spray pattern. Due to the reliability and effectiveness rotary turbo nozzles have been widely accepted in other fields. The nozzle rotates a powerful, zero-degree spray pattern in a circular motion to break down tough dirt and grime.

Figure 13:
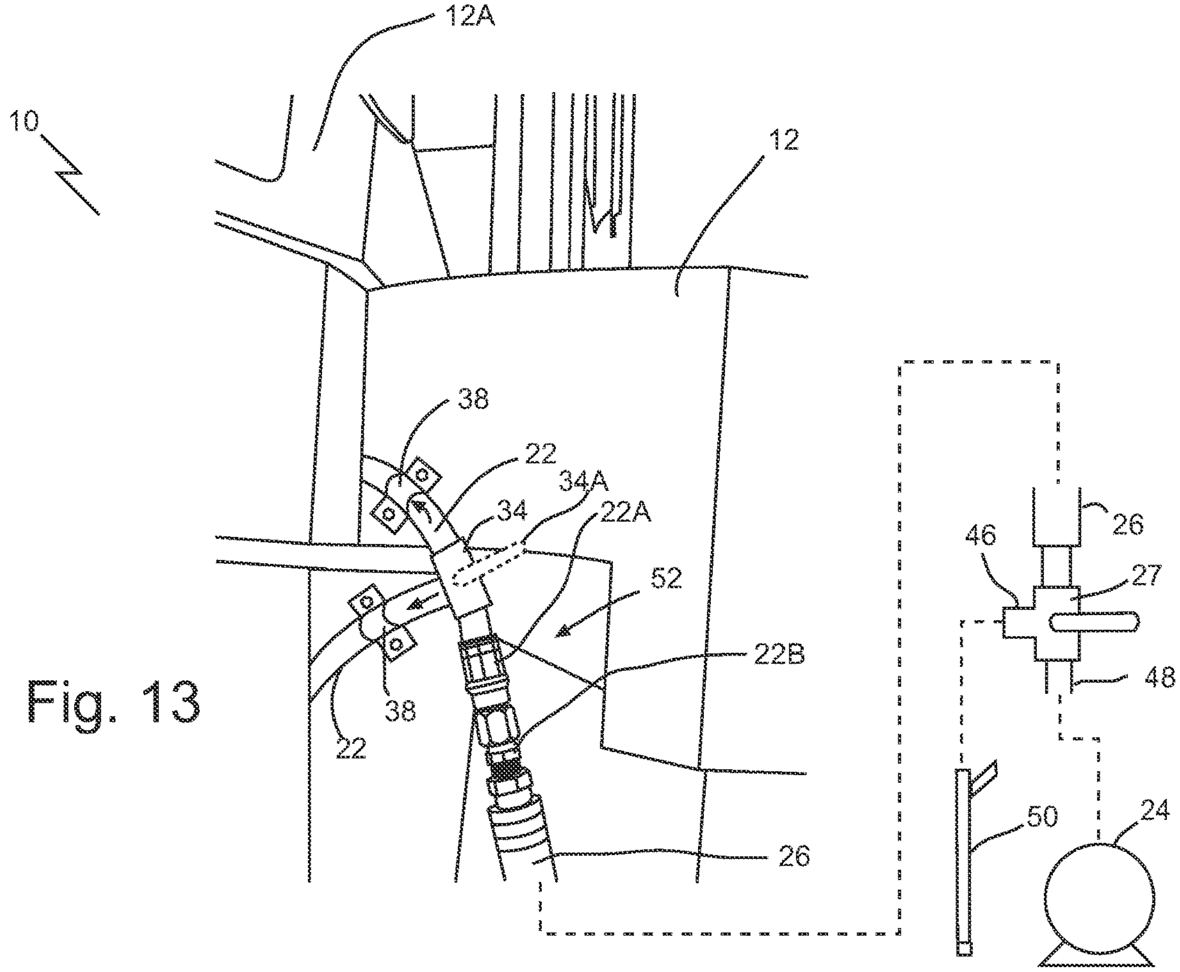
FIG. 13 is a perspective view of a quick connect of a supply line of the mobile wash system to connect the supply line to an external washer fluid supply.

Referring to FIG. 1, the apparatus 11 may comprise a washer fluid supply 26, for example a washer fluid supply 26 external to the mobile equipment 12. The apparatus 11 may comprise a pump 24 connected to supply washer fluid to the high-pressure supply line 22. The pump 24 may supply the washer fluid to the high-pressure supply line 22 from the external washer fluid supply 26 through a washer fluid supply connector 22B, such as a quick connect fitting. The system may be operated via the use of a valve (not shown). The washer fluid supply 26 may comprise water or air. Referring to FIG. 13, the supply 26 may receive fluid from a valve 27 of the pump system, which may selectively feed water to the lines 26, or an outlet 46 that feeds a water wand. An inlet 48 may receive fluid from the pump 24.

Figure 14:
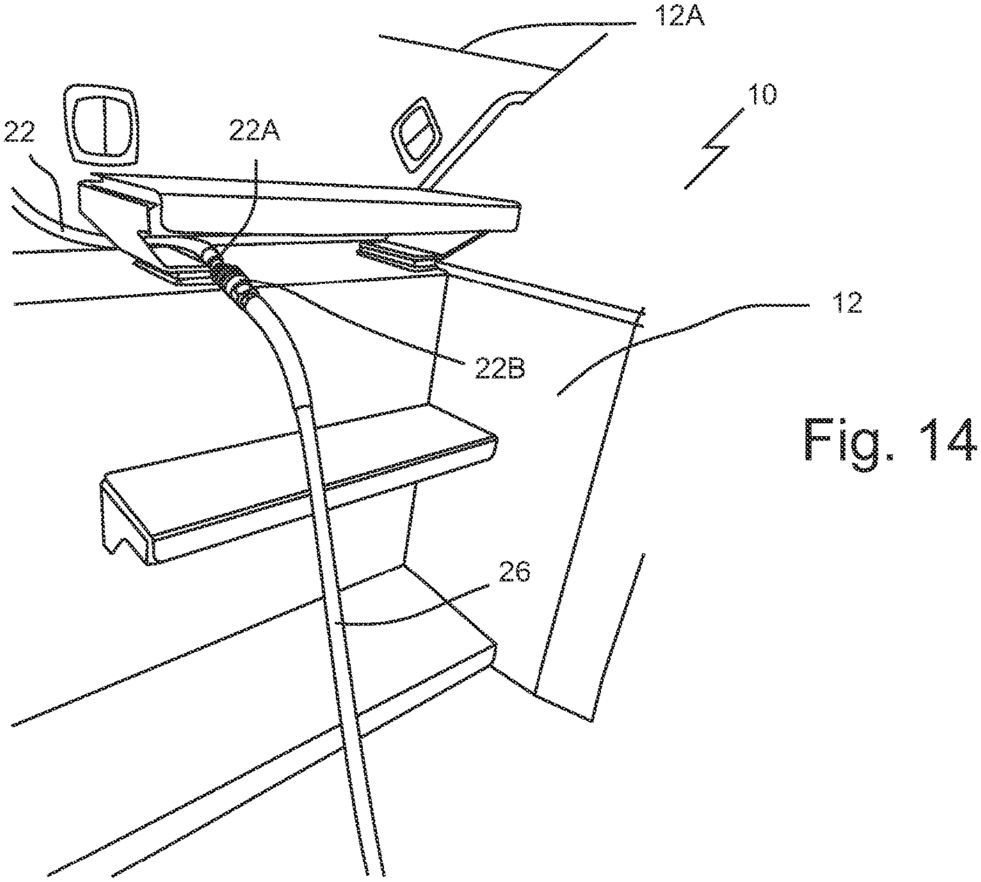
FIG. 14 is a perspective view of a quick connect of a supply line of the mobile wash system to connect the supply line to an external washer fluid supply.

Referring to FIGS. 13 and 14, the high-pressure supply line 22 may define a washer fluid supply connector 22B, for example a quick-connect fitting. The washer fluid supply connector 22B of the high-pressure supply line 22 may have an external mount, such as if the line 22 terminates outside of the mobile equipment 12. Having the washer fluid supply connector 22B accessible from an exterior of the mobile equipment 12 may allow for the high-pressure supply line 22 to be conveniently connected to and disconnected from an external washer fluid supply 26. The washer fluid supply connector 22B may be secured to the exterior of the mobile equipment, for example through the use of a hose clamp 38, and may reduce the need to remove guarding 28, panels 30 or seats to access the apparatus 11. Operation of the wash system 10 may involve connecting the high-pressure supply line 22 to the washer fluid supply 26 located outside of the mobile equipment 12, supplying the fluid to the high-pressure supply line 22, and disconnecting the washer fluid supply connector 22B of the high-pressure supply line 22 from the washer fluid supply 26B.

Referring to FIGS. 6, 7, 8, 10-12, and 15 the high-pressure supply line 22 may be connected to supply water to the manifold 18. The manifold 18 may be connected to supply washer fluid from the high-pressure supply line 22 to the plurality of pressure washer nozzles 20, and to other lines 22 and one or more manifolds 18, whether in parallel or in series. A plurality of manifolds 18 may be provided. Each manifold may be mounted in different areas of the mobile equipment in which one more of dirt, dust, and contaminants accumulate during use. Referring to FIG. 13, each manifold 18 may be connected to supply washer fluid to the plurality of manifolds in parallel, in series, or in sequence. The high-pressure washer fluid supply line comprises a selector valve 34, having plural outlets such as connected to the lines 22 that are downstream of the valve 34. A first outlet may be connected to a first manifold and a second outlet connected to a second manifold. Instead of or in addition to valve 34, the part shown in FIG. 13 as a valve 34 may be replaced with a fitting, such as a T-fitting. In the case of a T-fitting, washer fluid pressure is provided to plural manifolds 18 simultaneously, and in parallel. In another cases, the second manifold 18 may be connected to received washer fluid from the first manifold 18, i.e., in series with the first manifold. The washer fluid may pass through a high-pressure filter (not shown) before entering the manifold 18. The high-pressure supply line 22 may be connected to the manifold 18 at one or more of the threaded ends 18B through the use of a pipe fitting 21 for example a 3/4" pipe to a joint industry council (JIC) connector. The pipe fitting 21 may connect to the threaded end 18B of the manifold through the use of a threaded end 21A, and to a high-pressure supply line 22 through the use of a barbed end 21B. The pipe fittings 21 used may comprise a suitable structure, such as a 90-degree fitting 21C. If the manifold 18 is at the end of a flow path through the equipment, then a pipe cap 23 is connected to the opposite threaded end 18B of the manifold 18. In other cases, one manifold 18 may feed other manifolds, for example in series, using fittings 21 and lines 22 between respective manifolds 18. The apparatus may comprise a plurality of manifolds 18 (FIG. 15), each manifold 18 having a plurality of pressure washer nozzles 20, and each manifold 18 may be connected to the high-pressure supply line 22. The mobile equipment 12 may define a plurality of enclosed areas 14 and each of the plurality of enclosed areas 14 may contain one or more of the plurality of manifolds 18 and respective plurality of pressure washer nozzles 20.

Figure 7:
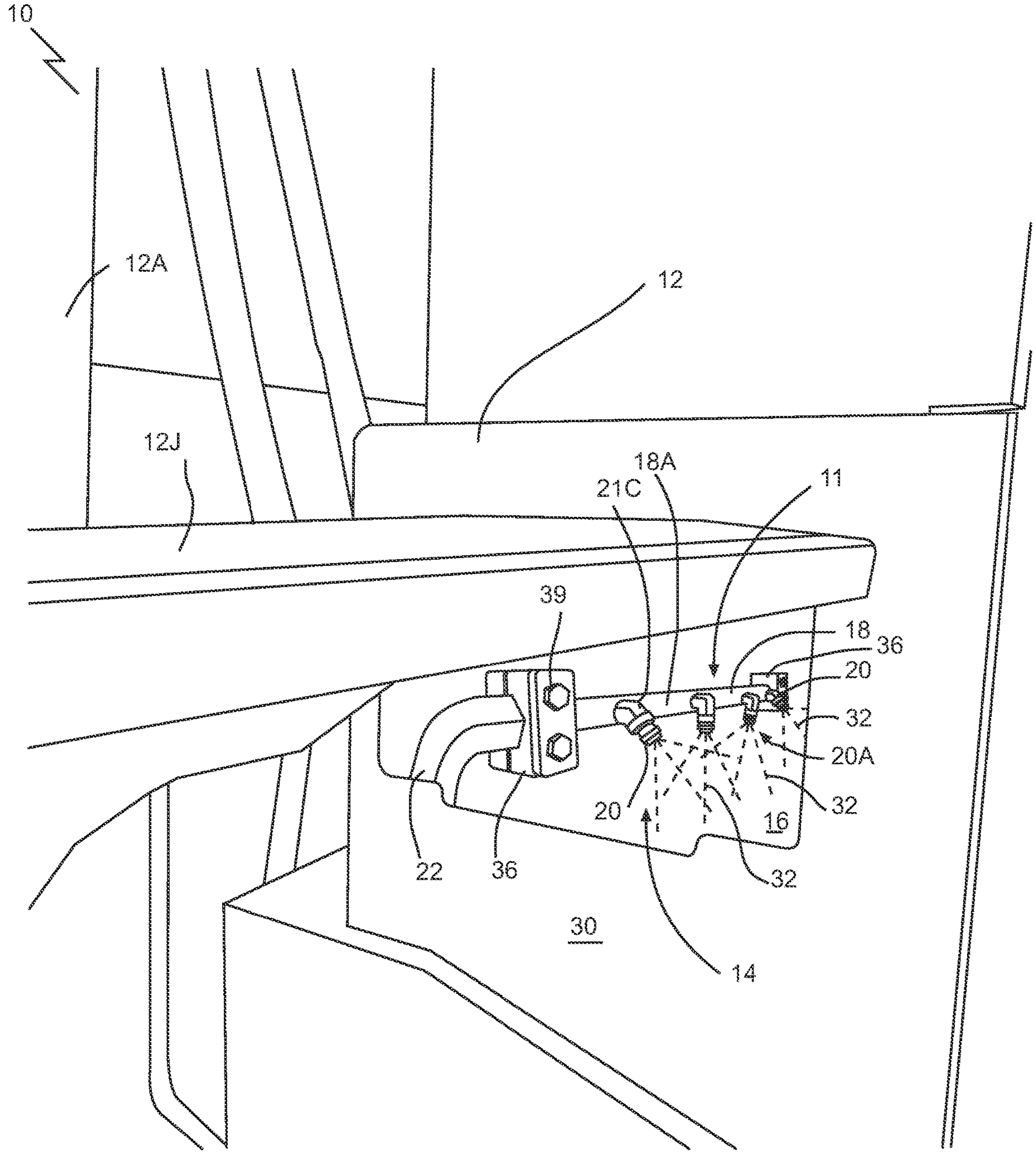
FIG. 7 is a perspective view of a mobile wash system installed on mobile equipment, in an enclosed compartment adjacent a step up to a doghouse of the mobile equipment.
Figure 8:
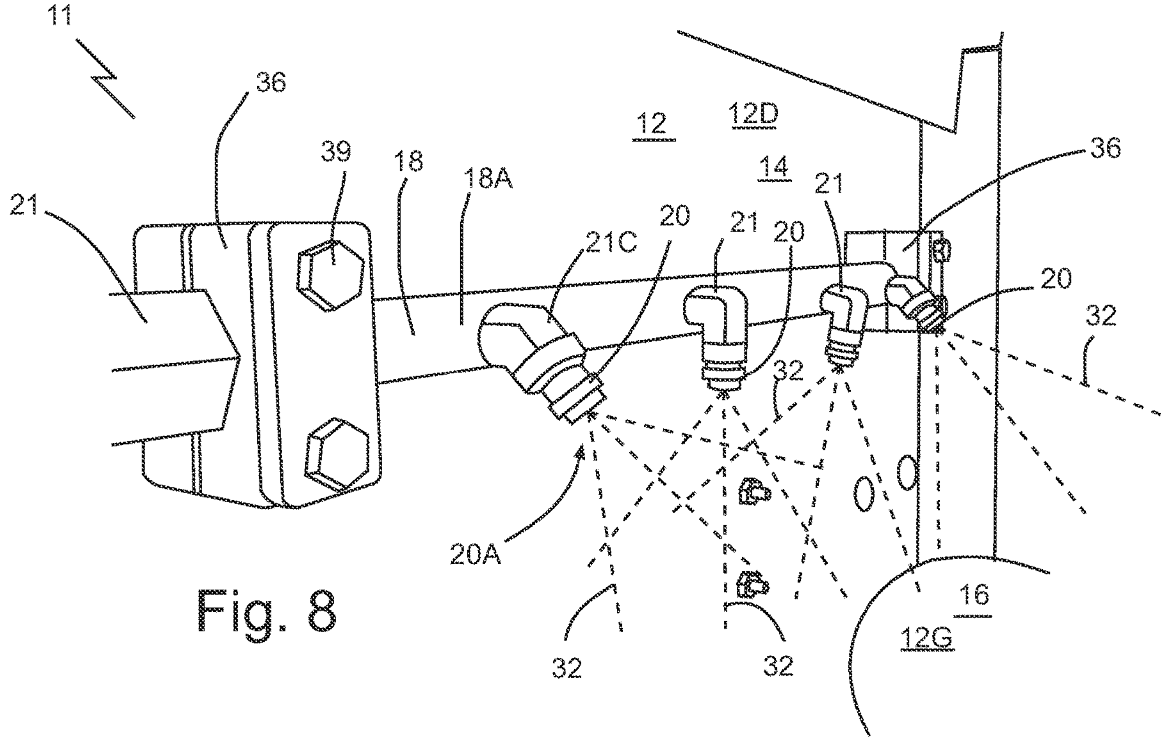
FIG. 8 is a perspective view of a manifold assembly of a mobile wash system installed in an enclosed area, namely an engine compartment, of mobile equipment.
Figure 9:
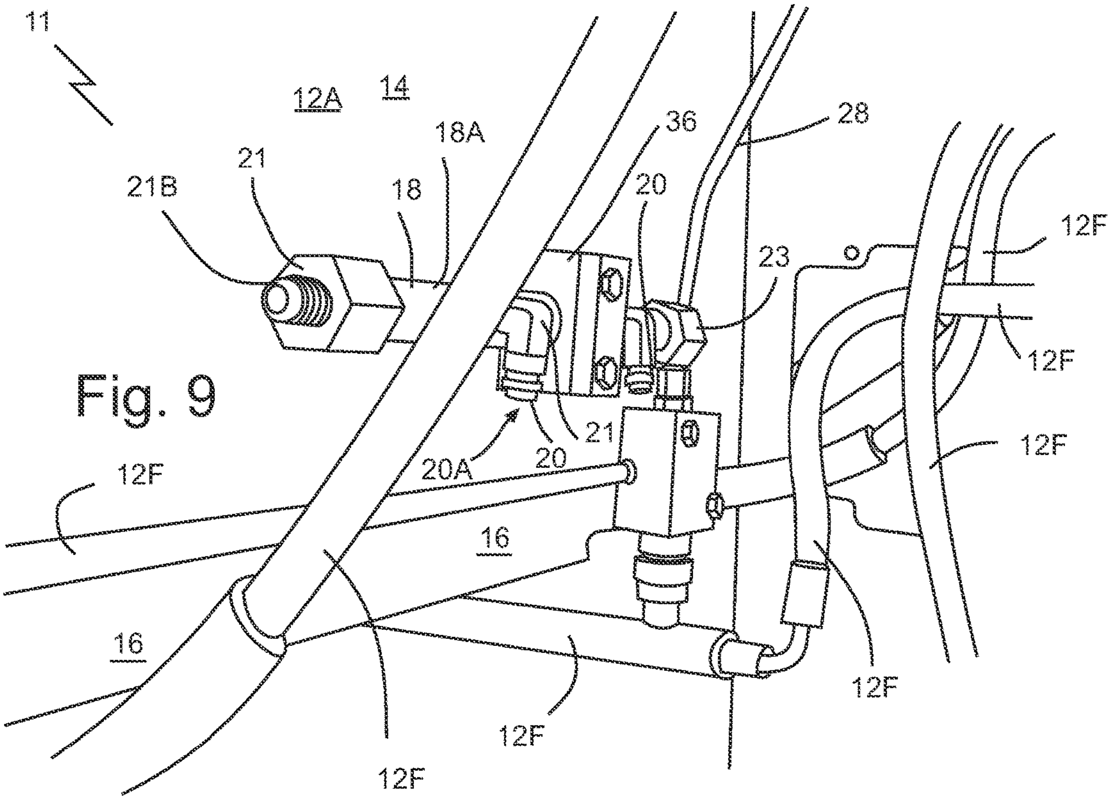
FIG. 9 is a perspective view of a manifold assembly of a mobile wash system installed in an enclosed area, namely a compartment in a doghouse of, the mobile equipment.
Figure 10:
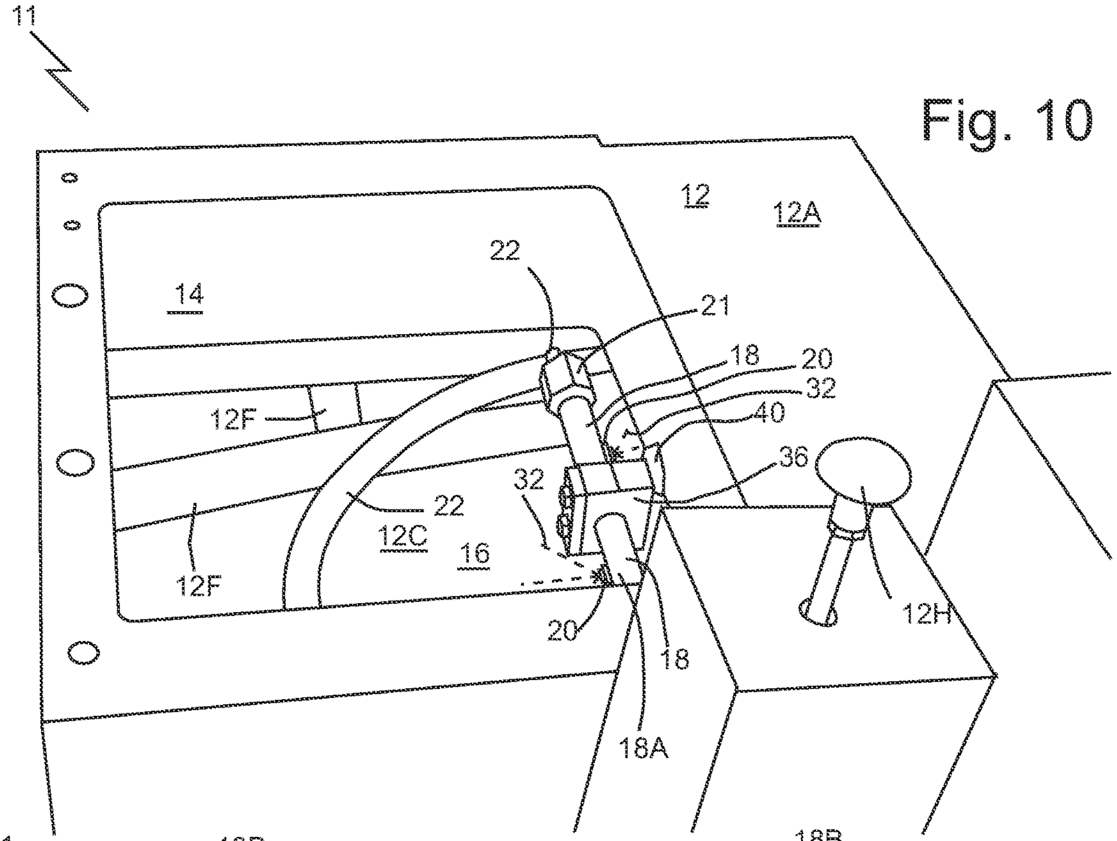
FIG. 10 is a perspective view of a manifold assembly of a mobile wash system installed in an enclosed area, namely a compartment that is located below a seat of the mobile equipment, with the seat removed to expose the enclosed area.
Figure 11:
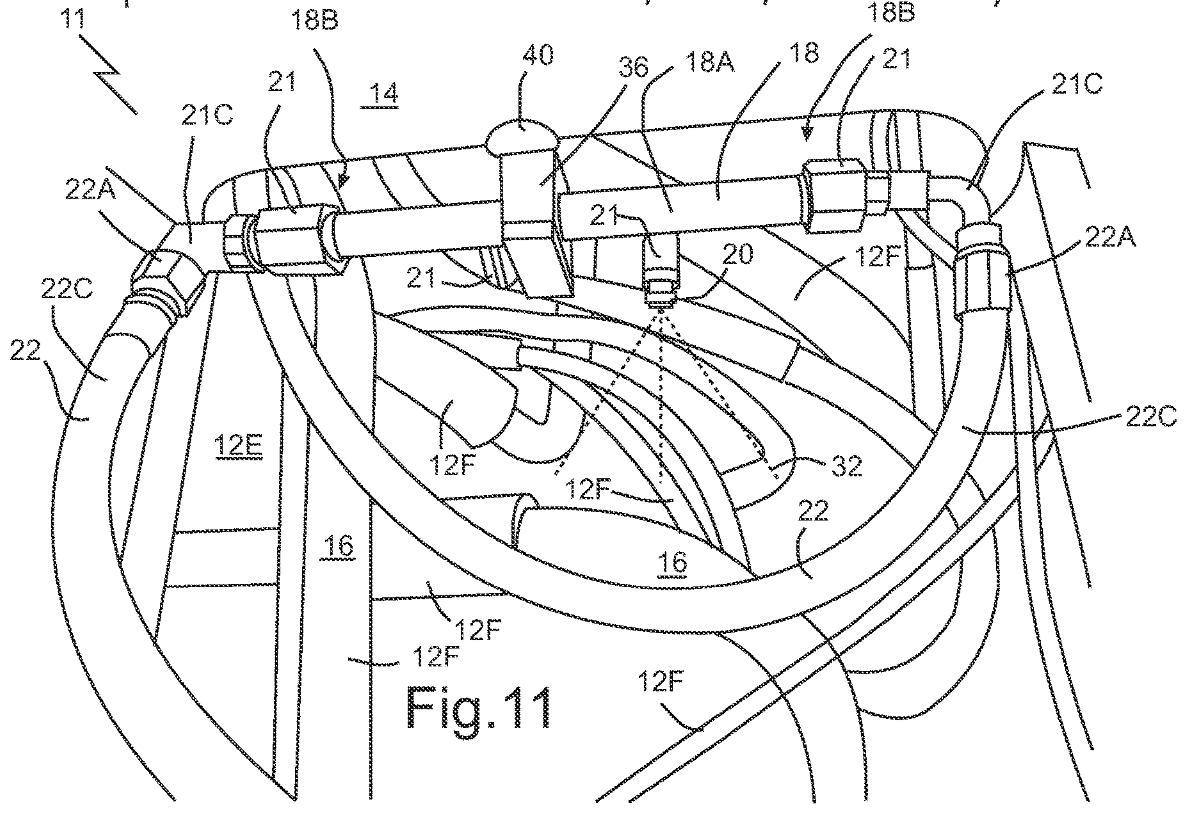
FIG. 11 is a perspective view of the manifold assembly from FIG. 10 in greater detail, with the cab seat removed.
Figure 12:
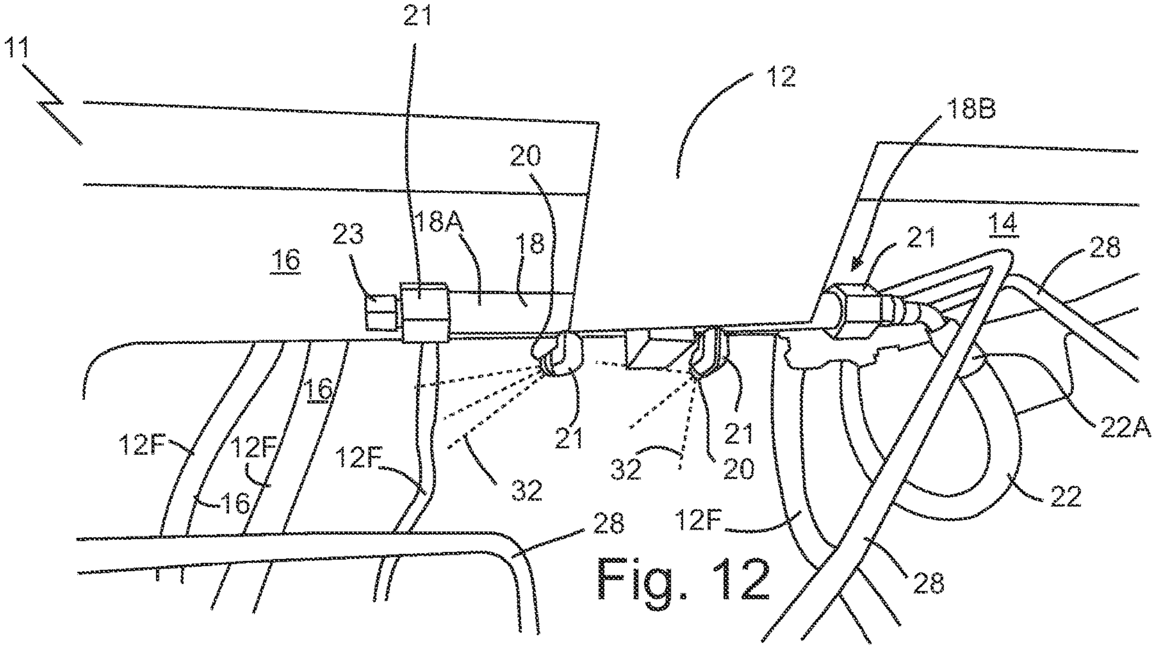
FIG. 12 is a perspective view of a mobile wash system of FIG. 9 installed in an enclosed area of mobile equipment.

Referring to FIGS. 7-12 and 15, the system 10 may be installed in various enclosed areas 14, for example areas 14 that may be difficult to access due to guarding 28, panels 30, and the structure of the mobile equipment 12. Referring to FIG. 7 the system 10 is shown installed in an enclosed compartment adjacent a step 12J up to a doghouse or cab 12A of the mobile equipment, with the cab 12A mounting various related components, such as controls 12H and a seat (not shown). Referring to FIG. 8 the system 10 is shown installed in an engine compartment 12D of the mobile equipment. Referring to FIG. 9 the system is illustrated as installed in a compartment in a doghouse or cab 12A of the mobile equipment. Referring to FIGS. 10 and 11 the system 10 is illustrated as being installed in a compartment or area 12C that is located below a seat of the mobile equipment, within a cab 12A of the equipment. The spray 32 from the spray end 20A of the pressure washer nozzles 20 may be used to dislodge dirt, dust, and contaminants 16 that have accumulated in the enclosed area 14 during use of the mobile equipment 12, such as various accumulations that occur on the hydraulic lines 12F for power use. the engine 12G of the mobile equipment 12, or on other areas.

Referring to FIGS. 6-12 and 15, the apparatus 11 may be installed within the enclosed area 14 of the mobile equipment 12 via suitable methods. Prior to supplying the high-pressure supply line 22 with washer fluid, the manifold 18 and plurality of pressure washer nozzles 20 may be installed within the enclosed area 14. The tube body 18A of the manifold 18 may be attached to the enclosed area 14 of the mobile equipment 12 via a suitable fashion, such as by using tube clamps 36, for example through the use of bolts 39, welds 40, traditional threaded metal fasteners, adhesive, flexible fasteners, magnetic fasteners, and others. In one case, the manifold 18 or other parts of the system may be installed using magnets instead of or in support of other permanent mounting techniques, for one or more of a variety of purposes, for example to facilitate installation, to allow a user more flexibility in placement of or re-positioning of the nozzles, or to avoid or reduce the amount of physical modification of the structure required to install the system and/or clamping parts, as any such modification, for example by welding, cutting, or drilling, may otherwise potentially compromise the strength or structural integrity of the structure. In one example of a magnet connection, a base part of a tube clamp 36 may comprise a magnet that directly or indirectly mounts to a metal part of or secured to the surrounding structure of the enclosed area. A tube clamp 36 may define a passage 36A, which may be sized or selected to allow the tube body 18A to pass through and be gripped and held within the tube clamp 36 once secured. A length of the tube body 18A of the manifold 18 may be selected to fit the size of the enclosed area 14. Suitable hose sizes may be used, for example, ¾" inch piping may be used at 12" or 24" or other lengths. A plurality of tube clamps 36 may be used when the length of the tube body 18A of the manifold 18 requires multiple tube clamps 36 to be properly secured to the mobile equipment 12. The apparatus 11 may comprise or be formed of a suitable material, for example various metals, polymer plastics, nylon and/or other types of non-metal components.

Figure 16:
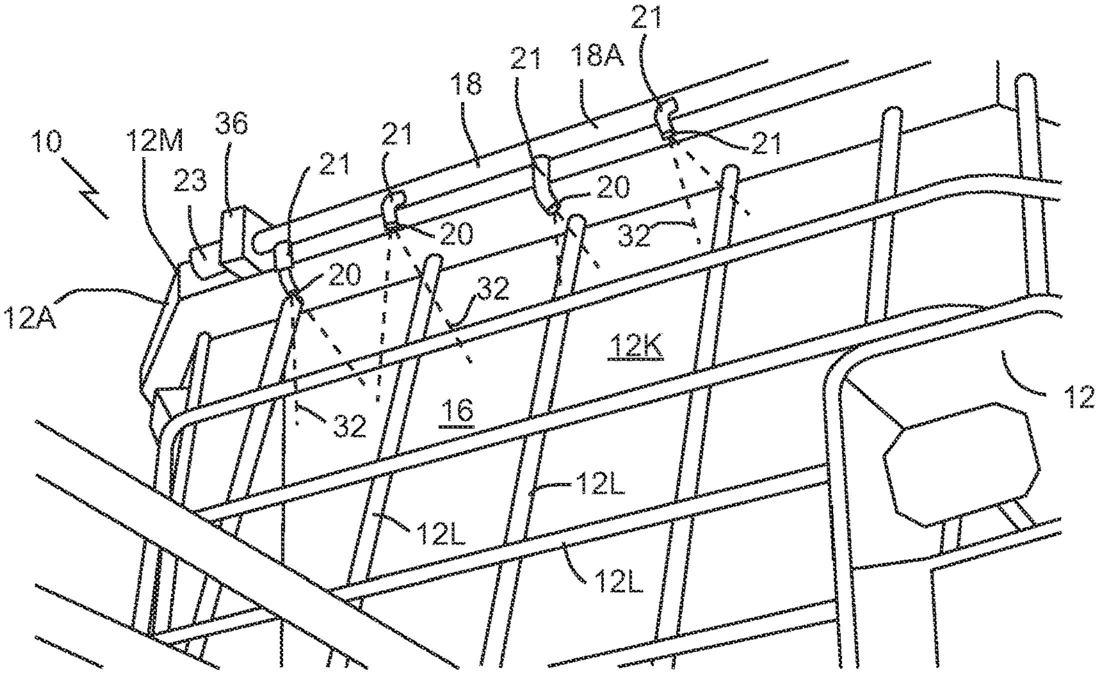
FIG. 16 is a perspective view of a manifold assembly of a mobile wash system installed on a front end of a roof of a cab of the mobile equipment, with the nozzles oriented toward a windshield of the mobile equipment.
Figure 18:
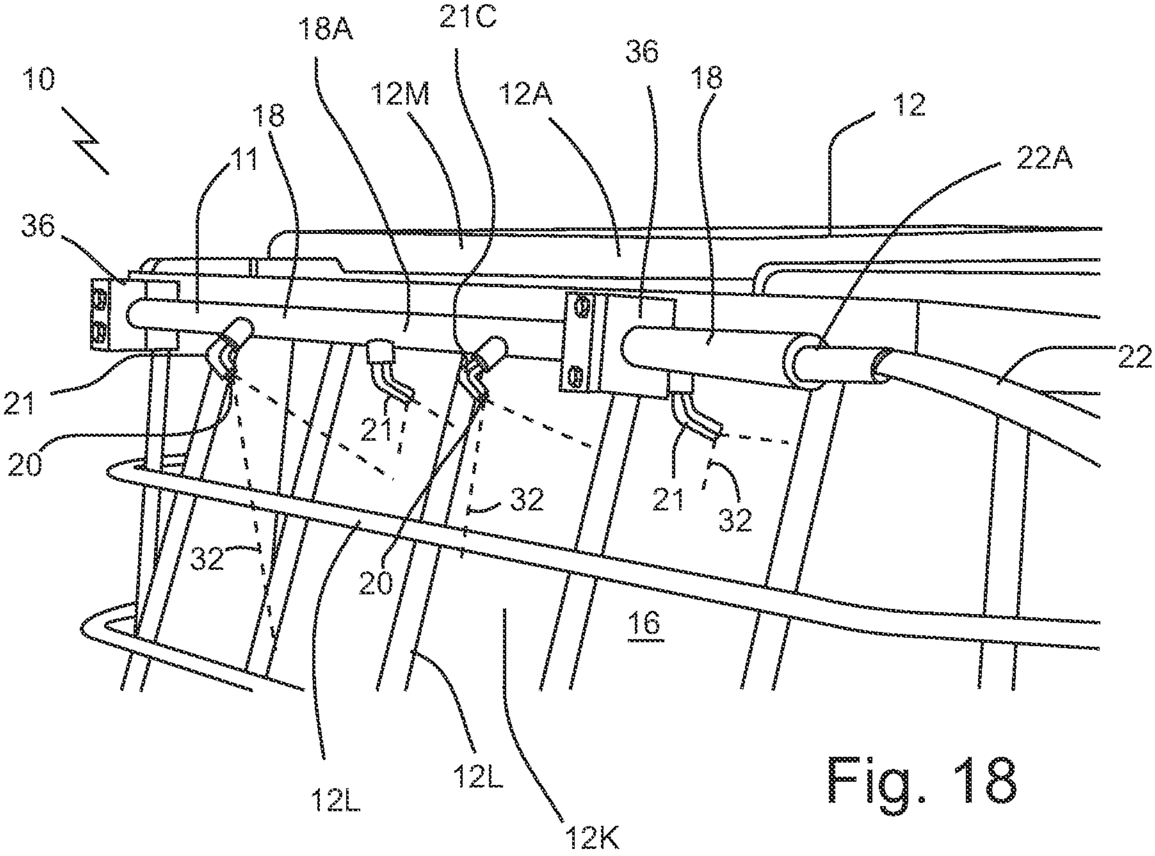
FIG. 18 is a perspective view of a manifold assembly of a mobile wash system installed on a front end of a roof of a cab of the mobile equipment, with the nozzles oriented toward a windshield of the mobile equipment, and using tube clamps.

Referring to FIGS. 16 and 18, the manifold 18 may be installed adjacent an exposed area such as a windshield 12K or window of system 10. In the example shown, the windshield 12K may comprise protective bars 12L, located adjacent to a roof 12M of a cab 12A. The bars 12L may consequently make it more inconvenient to wash the windshield. Thus, by mounting a manifold adjacent the windshield 12K, the user is able to use the washer fluid to clean the windshield with ease.

Figure 25:
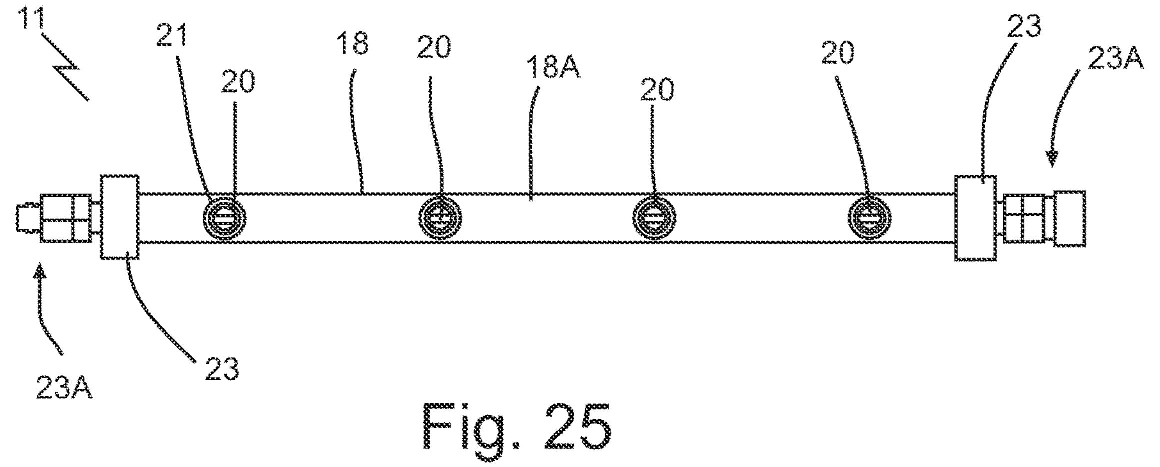
FIG. 25 is a side elevation view of another embodiment of a manifold of a mobile wash system.
Figure 26:
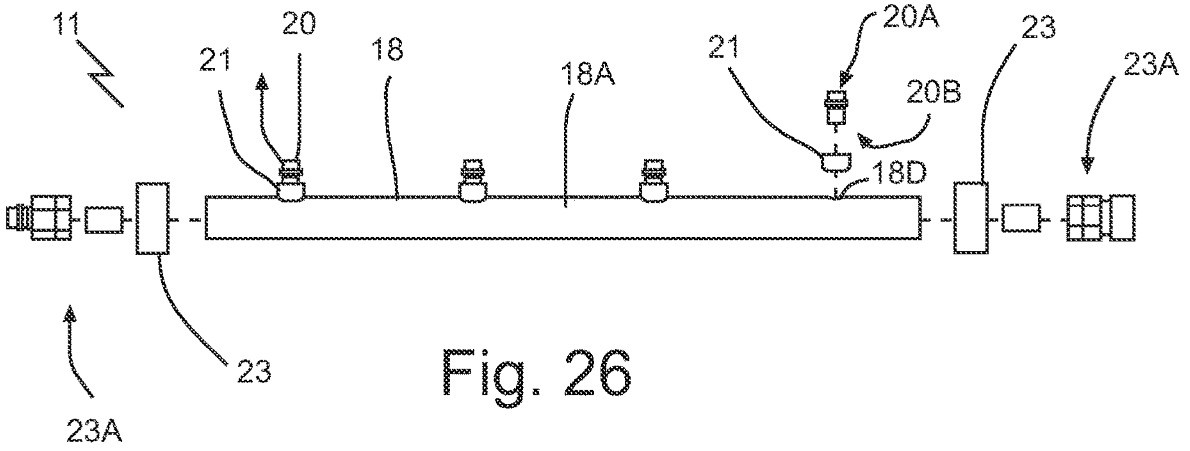
FIG. 26 is an exploded view of the mobile wash system of FIG. 25.

Referring to FIGS. 25-26, further embodiments of a manifold 18 with plural nozzles 20 is illustrated having suitable parts. The plurality of pressure washer nozzles 20 may be adjustable about a range of angular positions to aim in predetermined directions. In the example shown, each nozzle 20 may be rotated about its axis in the threaded ends 18B, to achieve the desired angle, such as from zero to 360 degrees of angular range of motion. The plurality of pressure washer nozzles 20 may be adjustable about a range of spray pattern, for example between 0 and 80 degrees. The plurality of pressure washer nozzles 20 may be oriented between 20 and 32 inches the area, although other distances may be used. The plurality of pressure washer nozzles 20 may be oriented to overlap, with adjacent of the plurality of pressure washer nozzles, in spray pattern. Thus, similar to an irrigation system, the nozzles 20 may be arranged to spray the same parts of area 12 for maximum efficiency. The system may require a minimum pressure to operate, for example the high-pressure washer fluid supply line may be connected to provide washer fluid at 500 psi or greater.

Referring to Tables 1 and 2 below, a desired fluid pressure may be set by varying various structural characteristics of apparatus 11. Fluid pressure may be measured in pounds per square inch (PSI), and may be varied by changing the gallons per minute (GPM) of the pump, the size of the nozzle orifice of the spray end 20A of the pressure washer nozzle 20.

TABLE 1

| | | Quantity of Nozzles/Pressure in psi: | | | |
|---|---|---|---|---|---|
| | Size | 2 Nozzles | 3 Nozzles | 4 Nozzles | 5 Nozzles |
| 4 GPM | 2 | 4000 | 1800 | 1000 | 700 |
| | 2.5 | 2200 | 1000 | 600 | — |
| | 3 | 1900 | 750 | — | — |
| | 4 | 1000 | — | — | — |
| 5 GPM | 2 | — | 2800 | 1600 | 1000 |
| | 2.5 | 4000 | 1600 | 900 | 600 |
| | 3 | 2700 | 1300 | 600 | — |
| | 4 | 1500 | 650 | — | — |
| | 5 | 1000 | — | — | — |
| 6 GPM | 2 | — | 4400 | 2250 | 1600 |
| | 2.5 | — | 2200 | 1300 | 900 |
| | 3 | 4000 | 1900 | 1000 | 650 |
| | 4 | 2400 | 1000 | 550 | — |
| | 5 | 1400 | 650 | — | — |
| | 6 | 1000 | 450 | — | — |

TABLE 2

| Nozzle Orifice Size | Hole size | | 500 PSI | 600 PSI | 700 PSI | 800 PSI | 1000 PSI | 1500 PSI | 2000 PSI | 2500 PSI | 3000 PSI | 3500 PSI |
|---|---|---|---|---|---|---|---|---|---|---|---|---|
| | .034"/ 0.86 mm | GALLONS PER | .71 | .77 | .84 | .89 | 1.0 | 1.2 | 1.4 | 1.6 | 1.7 | 1.9 |
| 2.5 | .042"/ 1.07 mm | MINUTE | .9 | 1.0 | 1.0 | 1.1 | 1.3 | 1.6 | 1.8 | 2.0 | 2.2 | 2.3 |
| 3.0 | .043"/ 1.09 mm | | 1.1 | 1.2 | 1.3 | 1.4 | 1.5 | 1.8 | 2.1 | 2.4 | 2.6 | 2.8 |
| 3.5 | .048"/ 1.22 mm | | 1.3 | 1.4 | 1.5 | 1.6 | 1.8 | 2.2 | 2.5 | 2.8 | 3.1 | 3.3 |
| 4.0 | .052"/ 1.32 mm | | 1.4 | 1.6 | 1.7 | 1.8 | 2.0 | 2.5 | 2.8 | 3.2 | 3.5 | 3.7 |
| 4.5 | .055"/ 1.40 mm | | 1.6 | 1.7 | 1.9 | 2.0 | 2.3 | 2.8 | 3.2 | 3.6 | 3.9 | 4.2 |
| 5.0 | .057"/ 1.45 mm | | 1.8 | 1.9 | 2.1 | 2.2 | 2.5 | 3.1 | 3.5 | 4.0 | 4.3 | 4.7 |
| 5.5 | .060"/ 1.52 mm | | 1.9 | 2.1 | 2.3 | 2.5 | 2.8 | 3.4 | 3.9 | 4.3 | 4.8 | 5.1 |
| 6.0 | .062"/ 1.57 mm | | 2.1 | 2.3 | 2.5 | 2.7 | 3.0 | 3.7 | 4.2 | 4.7 | 5.2 | 5.6 |
| 6.5 | .064"/ 1.63 mm | | 2.3 | 2.5 | 2.7 | 2.9 | 3.3 | 4.0 | 4.6 | 5.1 | 5.6 | 6.1 |
| 7.0 | .067"/ 1.70 mm | | 2.5 | 2.7 | 2.9 | 3.1 | 3.5 | 4.3 | 4.9 | 5.5 | 6.1 | 6.5 |

Pounds Per Square Inch = PSI

Figure 17:
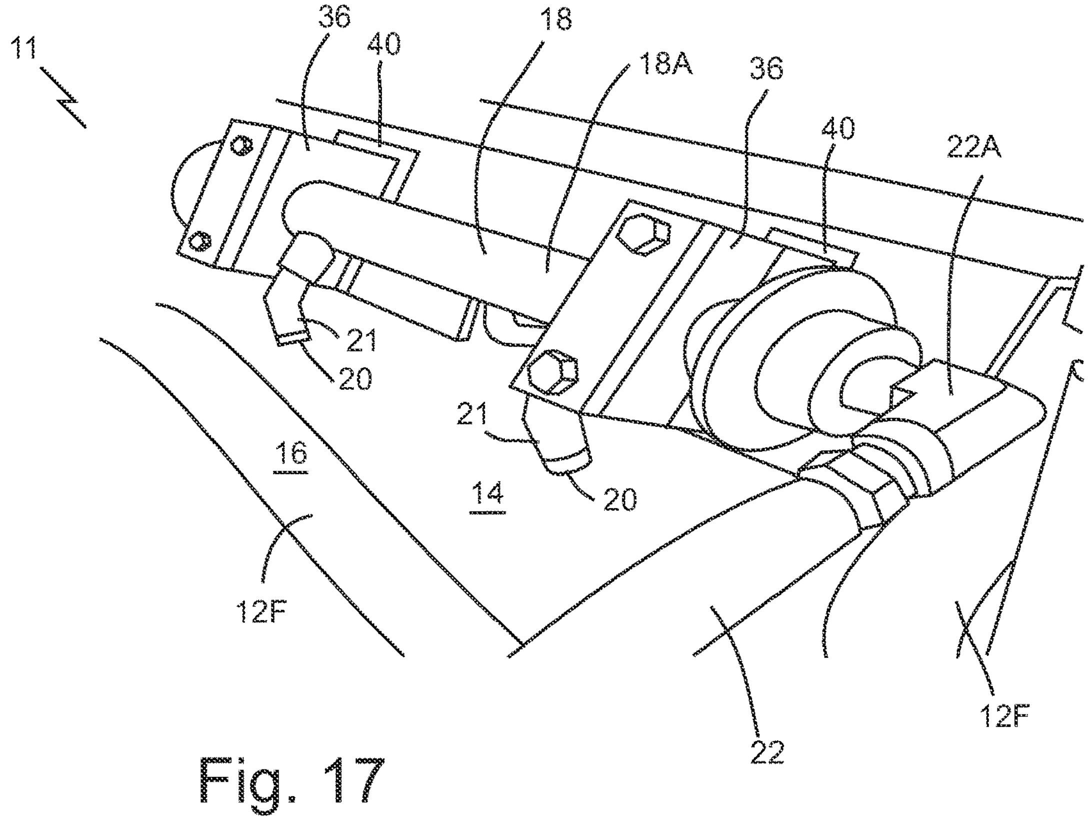
FIG. 17 is a perspective view of a manifold assembly of a mobile wash system installed in an enclosed area of the mobile equipment.
Figure 19:
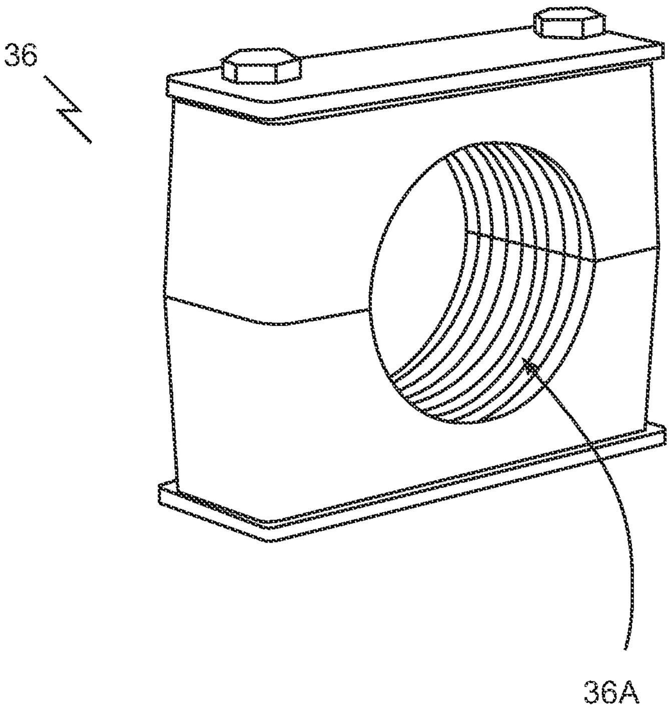
FIG. 19 is a perspective view of a magnetic tube clamp.

Referring to FIGS. 17 and 19, the system 10 comprise various useful features. The system may be adapted to magnetically attach to any metal surface with high strength earth magnets. The system may have the ability to aim nozzles in any direction. For the magnet, a user may take an existing tube clamp, drill out the base and tap it (thread it), and thread in a magnet plug. The clamp may have polypropylene bushings, but the body is metal. The system may use the high-pressure filter to protect nozzles from contamination. The system may have a Full stainless-steel construction. The system may permit the choice of spray patterns of 15 degrees, 25 degrees or 40 degrees. Sprayer manifolds may be provided in suitable sizes, such as in sizes of 36" with 6 nozzles, 24" manifold with 4 nozzles and 24" manifold with 3 nozzles. Heavy duty polypropylene attachment clamps may be used.

Figure 20:
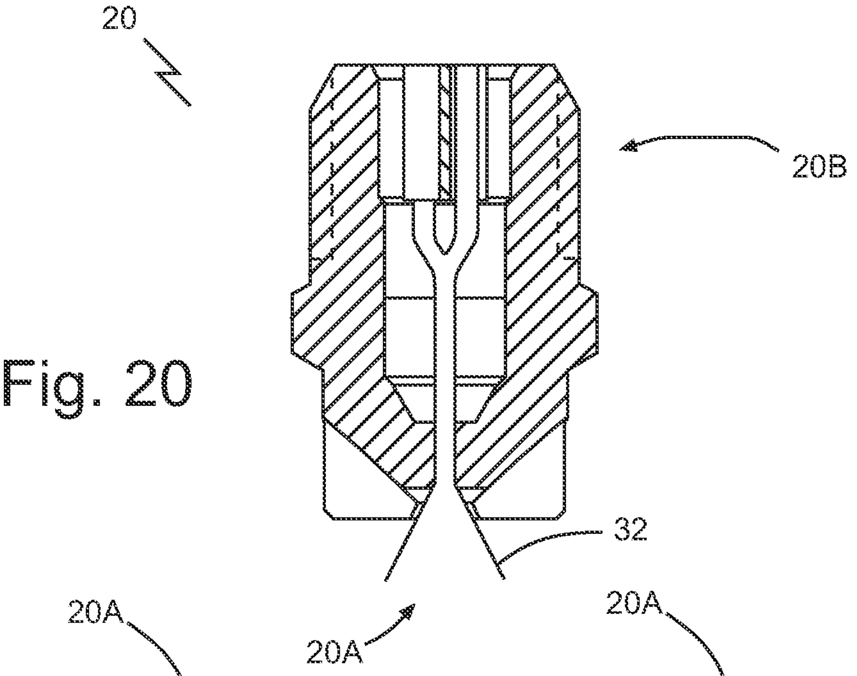
FIG. 20 is a cross-sectional view of a pressure washer nozzle.
Figure 21:
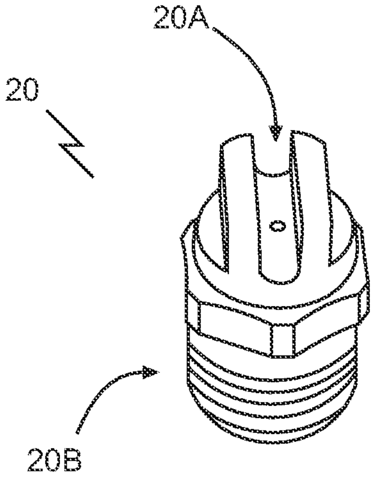
FIG. 21 is a perspective view of a pressure washer nozzle.
Figure 22:
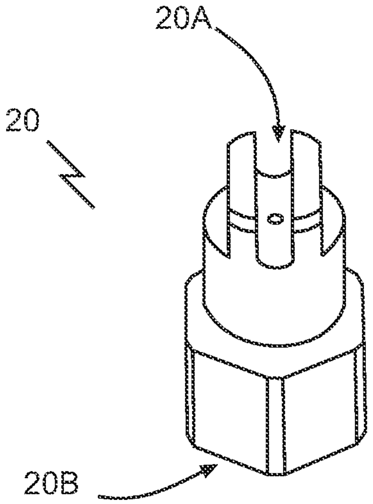
FIG. 22 is a perspective view of another embodiment of a pressure washer nozzle.
Figure 23:
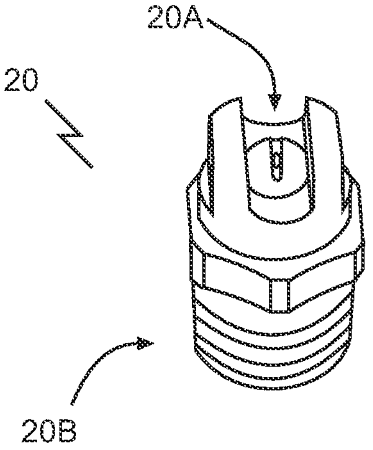
FIG. 23 is a perspective view of another embodiment of a pressure washer nozzle.
Figure 24:
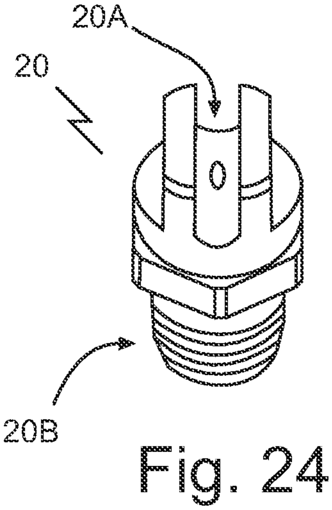
FIG. 24 is a perspective view of another embodiment of a pressure washer nozzle.

Referring to FIGS. 20-24, suitable nozzles 20 may be used. A washjet may be used. A high impact spray and high-pressure operation may ensure optimal cleaning—ideal for pressure washing. Long life materials may be provided, for example using stainless steel. Flat spray nozzles may be provided for an even edge fan type spray pattern. A uniform spray distribution from 0.27 to 78 GPM (gallon per minute, 1.0-290 lpm), by using optional internal guide vanes to stabilize the liquid tolerance. Spray angles from 0 degrees (solid stream) to 85 degrees may be selected. Operating pressures may range from 300 to 4000 psi. Certain nozzles may have tungsten carbide orifice inserts for maximum erosion resistance. As shown in FIG. 20, as the liquid exits through the rounded U shape of the orifice, it forms into a flat spray 32 pattern. The distribution is even at pressures above 300 psi (20 bar).

Referring to FIGS. 25-26, various nozzle sizes may be used. The pressure washer nozzles have an inner diameter of between 0 and 0.033 inches, for example 0.026 as shown below. An example method of selecting the right size of nozzles and the system 10 is discussed herein. First, the number of areas of the mobile equipment are assessed, and the pump size and washer fluid pressure are determined. If the pump strength is insufficient to feed all the areas, desired, then it may be decided to use either a valve to divert flow to one or more manifolds at a time while not supplying other manifolds, and then switching. If pump strength is insufficient, the pump 24 may be upgraded or replaced. The number and size of nozzles may be selected using the information in Tables 1-3. The nozzles may need to be selected to create enough restriction throughout the system in order to maintain the right pressure. Next, the manifolds are positioned in the respective areas, aligning them with the intended target. Nozzles 20 and/or manifold 18 may be oriented to maintaining 20 to 32 inches from the surface to be treated. The spray angle may be adjusted with low pressure water supply, for example by installing the pressure washer supply line, verifying water supply is turned on engaging two-way selector valve, and once low-pressure water is spraying adjust nozzles, ideally achieving 20 degree overlap pattern. The engine may require cooldown period prior to operating water in system.

Spray Nozzle Options

Various spray nozzles may be used, including:

a. Sewer Nozzles: Sewer nozzles, also known as sewer jetting nozzles or sewer cleaning nozzles, are specifically designed for cleaning and unclogging sewer lines. They typically feature a forward-facing jet and rear-facing jets that propel water backward to clear obstructions and clean the pipe walls.

b. Rotating Nozzles: Rotating nozzles, also called rotary nozzles or turbo nozzles, are designed to produce a spinning and high-impact spray pattern. They are commonly used in pressure washers for heavy-duty cleaning tasks, as the rotating action increases the cleaning power and efficiency.

c. Flat Fan Nozzles: These nozzles produce a flat, fan-shaped spray pattern. They are commonly used for wide-area coverage and are suitable for applications like cleaning, cooling, and coating.

d. Full Cone Nozzles: Full cone nozzles create a circular spray pattern, dispersing liquid over a complete 360-degree area. They are often used in applications that require uniform distribution, such as fire suppression systems or agricultural sprayers.

e. Hollow Cone Nozzles: Hollow cone nozzles create a conical spray pattern with a hollow center. They are used when a focused spray is needed, such as in cleaning or gas scrubbing applications.

f. Adjustable Cone Nozzles: These nozzles allow the user to adjust the spray pattern from a narrow cone to a wider cone, providing flexibility for different cleaning or coating requirements.

g. Solid Stream Nozzles: Solid stream nozzles produce a concentrated, straight stream of liquid. They are commonly used for high-impact cleaning or precision rinsing tasks.

h. Air Atomizing Nozzles: These nozzles mix the liquid with compressed air to create a fine mist or fog-like spray. They are often used in applications that require precise control over droplet size or where a fine coating is needed.

Figure 15:
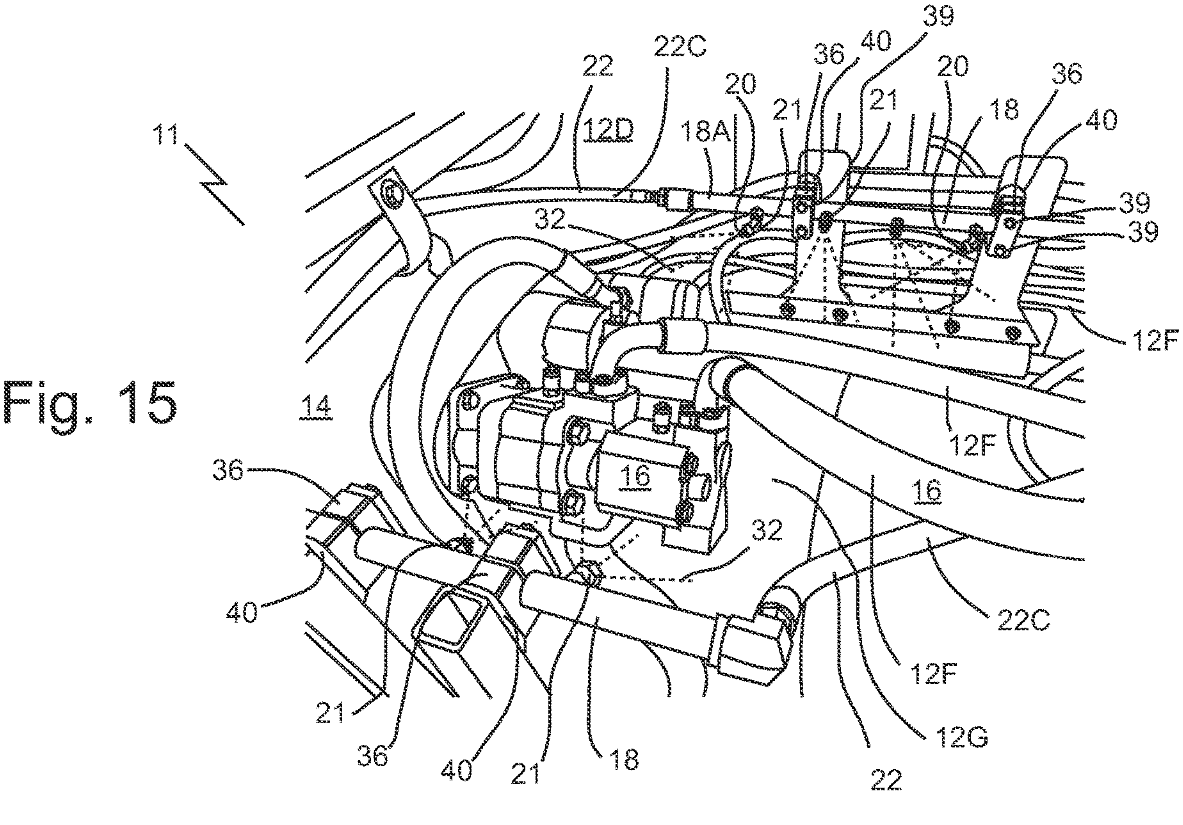
FIG. 15 is a perspective view of a manifold assembly of a mobile wash system installed in an enclosed area, namely a compartment an engine compartment of, the mobile equipment.

Referring to FIG. 15, the two-way selector valve 34 or other type of selector valve, if any valve 34 is used, may be positioned in a convenient and easily accessible location on the outer surface of the equipment. Next, the male quick connector 22B and high-pressure filter 52 may be installed, for example with the latter downstream of the connector 22B. The inlet side of the two-way selector valve may receive pressure washer fluid from the filter 52. Next, the hoses 22 extending from the manifolds to the two-way selector valve 34 are attached, ensuring secure and proper fittings. Next, the supply line 22 is connected with the main pressure washer outlet. A high-pressure T-fitting may be installed to facilitate a seamless connection. Once installed, the water supply line 26 may be connected to the two-way selector valve 34. Other types of selector valves 34 may be used, such as 2, 3, 4 or other, way valves to divert pressure to different areas, like a sprinkler system with zones. The valve 34 may comprise a control lever 52. If the valve 34 is replaced with a T-fitting, or another suitable fitting, then when washer fluid is flowing it will pass to both lines 22. With the valve 34 installed, the user need only move the actuator, such as lever 34A, to open and close the valve 34 and to select which of the outlets will receive washer fluid. Finally, at a suitable time, the user may connect the parts together and after each shift, switch on the system to ensure complete elimination of debris!

The mobile equipment may be needed to cool down over a predetermined period of time prior to providing high-pressure washer fluid to the manifold. The engine may require a cooldown period prior to operating water in system. Initial Temperature Drop (First 10-20%): After engine shutdown, an initial rapid temperature drop is observed. This can result in a decrease of approximately 10 20% in engine temperature within the first few minutes. The exact percentage drop can vary depending on factors such as engine size, operating temperature, and ambient conditions. Additional Temperature Drop: Following the initial temperature drop, the rate of cooldown gradually slows down. The engine's cooling rate becomes more gradual as time progresses. While it is challenging to provide precise figures, an estimate for the additional temperature drop can be around 12 degrees Celsius (1.8 3.6 degrees Fahrenheit) per minute. However, it's important to note that this rate can vary depending on factors such as engine size, cooling system design, and ambient conditions. Recommended minimum 30-minute cool down time.

TABLE 3

| | | Quantity of Nozzles/Pressure in psi: | | | |
|---|---|---|---|---|---|
| | Size | 2 Nozzles | 3 Nozzles | 4 Nozzles | 5 Nozzles |
| 4 GPM | 1 (0.026) | 4400 | 2200 | 1300 | 900 |
| | 2 (0.034) | 4000 | 1800 | 1000 | 700 |
| | 2.5 (0.042) | 2200 | 1000 | 600 | — |
| | 3 (0.048) | 1900 | 750 | — | — |
| | 4 (0.048) | 1000 | — | — | — |
| 5 GPM | 1 | — | | | |
| | 2 | — | 2800 | 1600 | 1000 |
| | 2.5 | 4000 | 1600 | 900 | 600 |
| | 3 | 2700 | 1300 | 600 | — |
| | 4 | 1500 | 650 | — | — |
| | 5 | 1000 | — | — | — |
| 6 GPM | 1 (0.026) | — | — | | |
| | 2 (0.034) | — | 4400 | 2250 | 1600 |
| | 2.5 (0.042) | — | 2200 | 1300 | 900 |
| | 3 (0.048) | 4000 | 1900 | 1000 | 650 |
| | 4 (0.048) | 2400 | 1000 | 550 | — |
| | 5 | 1400 | 650 | — | — |
| | 6 | 1000 | 450 | — | — |

The use of the system 10 may have various advantages.

Proactive Fire Risk Reduction: The system 10 may reduce the menace of equipment fires. The system may proactively address the root causes of fires by removing combustible materials before they lead to catastrophic failures. This significantly minimizes the chances of spontaneous combustion, electrical shorts, hydraulic line failure, and brake overheating. Enhanced Safety and Injury Prevention: Traditional cleaning methods often expose operators to high-risk scenarios when attempting to clean hard-to-reach areas. The system may ensure—operators' safety and reduces the risk of injuries. Additionally, improved windshield visibility enhances overall operational safety. Reduced Downtime, Increased Cleaning Frequency: Cleaning-related downtime is a thing of the past. Installing the system may expedite cleaning processes, transforming hours of labor into minutes. By removing the need for panel, fender, and seat removal, this innovative system not only saves time but also slashes cleaning labor costs.

Optimized Cooling Efficiency: Engines, transmissions, differentials, and other components dissipate a substantial amount of heat through convection. Beyond fire risk elimination, the system 10 may enhance convection efficiency by removing accumulated combustible materials. By maintaining optimal cooling efficiency, the system may contribute to the longevity and performance of your equipment.

The system 10 may be a cutting-edge system designed to address one of the most critical challenges facing the industry today: Equipment fires caused by combustible build-up and debris. Mobile equipment has engine components that operate at temperatures above the combustion point of wood, dust and flashpoint of engine and hydraulic oils. Additionally, electrical arc from failing components can be fire ignition points. The system may be engineered to eliminate combustible accumulation and drastically reduce the risk of equipment fires. These manifolds are magnetically attached in enclosed areas such as engine compartments and behind windshield guards (hard-to-reach spaces that have often been overlooked). No more struggling to clean these inaccessible areas, because if it's not easy, it won't get cleaned. And if it's not consistently cleaned, it is at risk of combusting In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method comprising supplying water to a pressurized water supply line mounted to mobile equipment, in which the pressurized water supply line has a water supply connector inlet that is connected between an external water fluid supply and a manifold, which mounts a plurality of pressure washer water nozzles located within an enclosed area of the mobile equipment, such that the water is ejected from the plurality of pressure washer water nozzles to dislodge dirt, dust, and contaminants that have accumulated in the enclosed area during use.

2. The method of claim 1 further comprising, prior to supplying the water, connecting the pressurized water supply line to the external water fluid supply.

3. The method of claim 2 further comprising, after supplying the water, disconnecting the pressurized water supply line from the external water fluid supply.

4. The method of claim 1 further comprising, prior to supplying the water, installing the manifold and plurality of pressure washer water nozzles within the enclosed area.

5. The method of claim 1 further comprising allowing the mobile equipment to cool down over a predetermined period of time prior to providing water to the manifold.

6. The method of claim 1 in which:

the manifold comprises a plurality of manifolds, each mounted in different areas of the mobile equipment in which one more of dirt, dust, and contaminants accumulate during use; and using one or more of a selector valve or branched fitting to provide water to the plurality of manifolds.

7. The method of claim 1 in which a pump is connected to supply water to the pressurized water supply line.

8. The method of claim 1 in which the water supply connector inlet has a quick-connect fitting.

9. The method of claim 8 in which the quick-connect fitting is mounted to the mobile equipment external to the mobile equipment.

10. The method of claim 1 in which the manifold:

comprises a plurality of manifolds, each mounted in different areas of the mobile equipment in which one more of dirt, dust, and contaminants accumulate during use; and is connected to supply water to the plurality of manifolds in parallel, in series, or in sequence.

11. The method of claim 1 in which the enclosed area is accessible by one or more of guarding, panels, or seats.

12. The method of claim 1 in which the mobile equipment comprises a loader, a lifter, a grain combine, a tractor, a plow, a harvester, a telehandler, a seed drill, a rake, a harrow, a hay baler, a grader, a mining truck, a mining shovel, a bulldozer, an excavator, a drill rig, a drag line, a crane, a boat, a forest machine, a skidder, a winch assist, a train car, a train engine, a rail.

13. The method of claim 1 in which one or more of the manifold, the plurality of pressure washer water nozzles, and the pressurized water supply line comprise metal.

14. The method of claim 1 in which the manifold is connected to the enclosed area using tube clamps.

15. The method of claim 1 in which the manifold is connected to the enclosed area using one or more of magnets, fasteners, welding, and adhesive.

16. The method of claim 1 in which the pressurized water supply line comprises a fluid filter.

17. The method of claim 1 in which:

the manifold comprises a plurality of manifolds, each mounted in different areas of the mobile equipment in which one more of dirt, dust, and contaminants accumulate during use; and one or more of the areas comprise a windshield or window.

18. The method of claim 1 in which the plurality of pressure washer water nozzles are one or more of:

adjustable about a range of angular positions to aim in predetermined directions;

adjustable about a range of spray pattern between 0 and 80 degrees;

oriented between 20 and 32 inches from a surface within the enclosed area; and oriented to overlap, with adjacent of the plurality of pressure washer water nozzles, in the spray pattern.

19. The method of claim 1 in which the pressurized water supply line is connected to provide water at 500 psi or greater.

20. The method of claim 1 in which the pressure washer water nozzles have an inner diameter of between 0 and 0.033 inches.

21. The method of claim 1 in which the manifold comprises first and second manifolds, each mounted in different areas of the mobile equipment in which one more of dirt, dust, and contaminants accumulate during use; and the pressurized water supply line comprises one or more of a selector valve, and a fitting, having plural outlets that comprise a first outlet connected to the first manifold and a second outlet connected to the second manifold.

22. The method of claim 1 in which the enclosed area comprises an engine compartment, and the plurality of water pressure washer nozzles are directed to the engine.

23. The method of claim 1 in which the enclosed area is within a doghouse or cab of the mobile equipment.

24. The method of claim 1 in which the enclosed area comprises a compartment located below a seat of the mobile equipment.

25. The method of claim 1 in which the plurality of pressure washer water nozzles have an orifice diameter of 0.067" or less.

26. The method of claim 25 in which the plurality of pressure washer water nozzles have an orifice diameter of 0.034" or less.

* * * * *